United States Patent [19]
Yasuma et al.

[11] Patent Number: 6,005,833
[45] Date of Patent: Dec. 21, 1999

[54] DISC DRIVE AND DRIVING METHOD OF LOADING MOTOR IN THE DISC DRIVE

[76] Inventors: Toshihiko Yasuma, c/o Mitsumi Electric Co., Ltd. of 8-8-2, Kokuryo-cho, Chofu-shi, Tokyo; Takayuki Igarashi, c/o Newtronics Co., Ltd. of 1-1, Bandai, Tendo-shi, Yamagata; Ken'ichi Furukawa, c/o Mitsumi Electric Co., Ltd. of 8-8-2, Kokuryo-cho, Chofu-shi, Tokyo, all of Japan

[21] Appl. No.: 08/939,254

[22] Filed: Sep. 29, 1997

[30] Foreign Application Priority Data

Sep. 27, 1996 [JP] Japan .................................... 8-277314

[51] Int. Cl.$^6$ .................................................... G11B 33/02
[52] U.S. Cl. ........................ 369/75.2; 369/77.1; 369/77.2
[58] Field of Search ................................. 369/75.1, 75.2, 369/77.1, 77.2

[56] References Cited

U.S. PATENT DOCUMENTS

| | | | |
|---|---|---|---|
| 4,680,748 | 7/1987 | Kobayashi | 369/77.1 |
| 4,796,251 | 1/1989 | Hirano | 369/75.2 |
| 4,882,722 | 11/1989 | Matsuura et al. | 369/75.2 |
| 5,164,934 | 11/1992 | Kase et al. | 369/77.1 |
| 5,210,725 | 5/1993 | Kase et al. | 369/19 |
| 5,574,711 | 11/1996 | Nakamichi | 369/77.1 |
| 5,691,969 | 11/1997 | Fujisawa | 369/77.1 |

FOREIGN PATENT DOCUMENTS 2 302 983  9/1996  United Kingdom .

*Primary Examiner*—David L. Ometz
*Assistant Examiner*—Tod Kupstas
*Attorney, Agent, or Firm*—Brian M. Mattson; Patents & TMS, P.C.

[57] ABSTRACT

A disc drive includes a disc drive main body having a playback or recording/playback mechanism of a disc and a disc tray which is constructed to support the disc thereon and is movable with respect to the disc drive main body between a disc eject position and a disc loaded position; and a motor provided in the disc drive main body for moving the disc tray, wherein the moving speed of the disc tray is variable by changing the number of rotations of the motor. The motor is driven by rectangular pulses from the motor driver, in which the number of rotations of the motor is varied by changing the on/off widths of the rectangular pulses so that the moving speed of the disc tray is reduced in a stepwise manner over the period from the start to the stop of the disc tray movement. This enables to realize a high speed movement of the disc tray without increasing the load to be imposed on the disc and the loading mechanism and the like with the use of a relatively small gear ratio in the rotational speed reduction mechanism, which results in easy operation of the emergency eject mechanism and the manual loading mechanism.

5 Claims, 12 Drawing Sheets

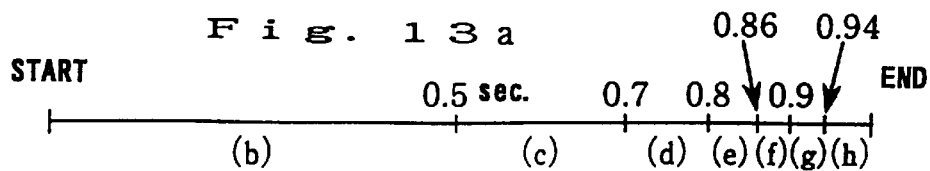
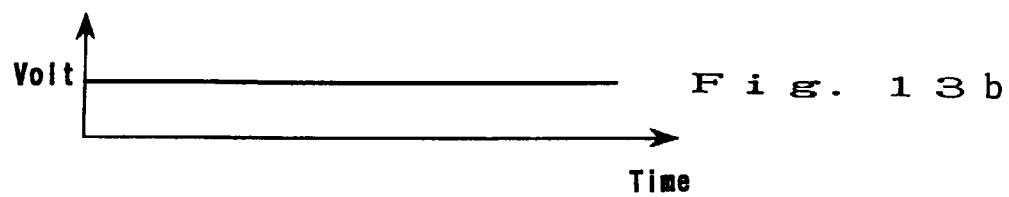
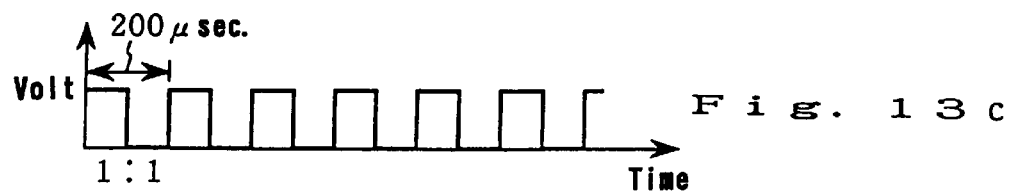
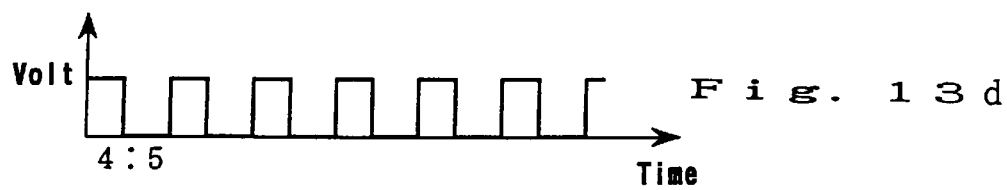
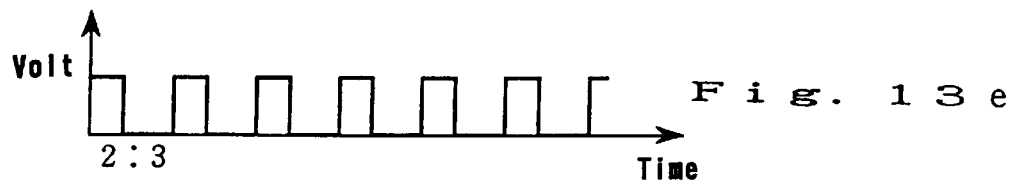
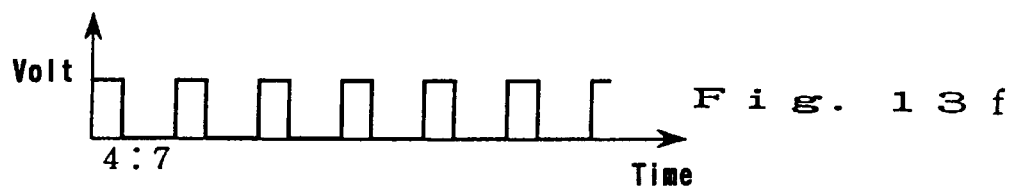
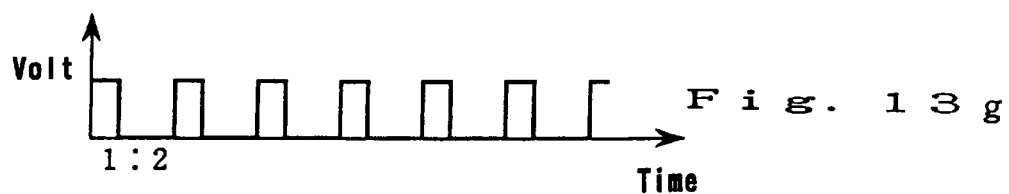
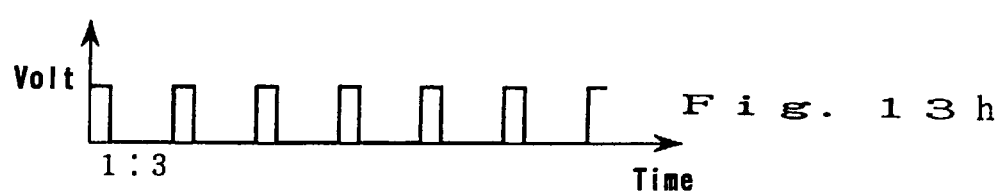

DISC DRIVE AND DRIVING METHOD OF LOADING MOTOR IN THE DISC DRIVE

BACKGROUND OF THE INVENTION

Field of the Invention

The present invention relates to a disc drive having at least the function of playing back an optical disc or the like, and more particularly to a disc drive having a disc tray which transfers an optical disc such as a CD-ROM between a disc placing/removing position (eject position) and a playback position (loaded position), and a driving method of a loading motor in the disc drive.

Description of the Prior Art

One example of disc drives for playing back an optical disc such as a CD-ROM or the like is disclosed in Japanese Patent Application No. HEI 7-201605. FIG. 1 is an exploded perspective view which shows the structure of the disc drive of this application and FIG. 2 is a top plan view of the disc drive.

As shown in these drawings, the disc drive 1B is constructed from a main body 2 and a disc tray 5 which moves backwards and forwards with respect to the main body 2 so as to be insertable into and ejectable out of the main body 2.

The main body 2 of the disc drive is roughly constructed from a bottom plate 11, a main circuit board assembly 12 provided above the bottom plate 11, a mechanism assembly 13 provided above the main circuit board assembly 12, and a casing 14 enclosing the upper side of the mechanism assembly 13.

The casing 14 has a top plate 14a, and a disc clamper 38 is installed on the underside surface (inner surface) thereof so as to be rotatable coaxially with a turntable 26 which will be described later. The casing 14 is attached to the upper portion of the mechanism assembly 13 with screws 17. The bottom plate 11 is attached to the lower portion of the mechanism assembly 13 with screws 17 with the main circuit board assembly 12 being interposed therebetween.

In a front plate 14e of the casing 14, an aperture 14f is formed to allow the disc tray 5 to be passed therethrough. A front panel 15 having a similar aperture 15a is attached to the front plate 14e via a cushioning frame 16 made of sponge. An eject switch 18 for driving the disc tray 5 is provided on the front panel 15.

The mechanism assembly 13 includes a roughly container-shaped chassis 20 which is provided with a mechanism unit 22 and a loading mechanism 30. The mechanism unit 22 is arranged within a concave portion 21 formed in the bottom portion 20a of the chassis 20, and the loading mechanism 30 is arranged in a space defined in front of the concave portion 21.

The mechanism unit 22 includes a base 23 which is provided with a spindle motor 25 for rotating an optical disc, a turntable 26, an optical pick-up (optical head) 27, and an optical pick-up moving mechanism 28.

Further, a rear end portion (back side of the main body 2) of the base 23 is supported by an insulator 29a made of an elastic material such as a rubber. This enables the base 23 to be freely pivotal with respect to the chassis 20 about the mounting position of the insulator 29a.

The loading mechanism 30 is provided for displacing the mechanism unit 22 between a lowered position and a raised position with respect to the pivotal point by the insulator 29, as well as for moving the disc tray 5 between the eject position (disc placing/removing position) and the loaded position (disc playing back position). The loading mechanism 30 is roughly constructed from a motor 31 provided at a front portion of the chassis 20, a rotational speed reduction mechanism 32 for reducing the rotational speed of the motor 31, a cam wheel (ascending/descending gear) 33 which is rotated via the rotational speed reduction mechanism 32, and a base ascending/descending member 35 which is displaced (pivoted) in accordance with the rotation of the cam wheel 33.

The loading motor 31 for the disc tray 5 is a DC motor, and is driven at a specified speed by a constant voltage.

The rotational speed reduction mechanism 32 is constructed from a roller 32a of almost truncated cone shape fixed at the tip of the rotation shaft of the loading motor 31, a wheel 32b having on its top a bevel rubber sheet which is brought into close contact with the outer peripheral cone surface of the roller 32a, a large gear 32c which meshes with a pinion gear (not shown in the drawings) provided below the wheel 32b, and a small gear 32d fixed coaxially above the large gear 32c.

As shown in FIG. 3, the cam wheel 33 is formed of a plastic material, and it includes a lower gear 33a which meshes with the small gear 32d of the rotational speed reduction mechanism 32, and an upper gear 33b which meshes with a rack gear (not shown in the drawing) formed on the underside surface of the disc tray 5 along its longitudinal direction (in the forward and backward direction thereof). Further, a circumferential cam groove 34 is formed in the outer circumference of the axle portion between the gears 33a, 33b. The cam groove 34 consists of a lower cam groove 34a formed between the lower gear 33a and a flange 331 which is provided between the two gears 33a and 33b, an upper cam groove 34b formed between the upper gear 33b and the flange 331, and an inclined cam groove 34c which connects both cam grooves 34a and 34b. In this case, the upper cam groove 34b is formed over nearly the entire circumference of the cam wheel 33, and the lower cam groove 34a is formed over the center angle range of about 10–45 degrees of the cam wheel 33.

On the other hand, the base ascending/descending member 35 is located between the cam wheel 33 and the base 23 as shown in FIG. 2. The base ascending/descending member 35 has a pair of arms 35a and 35b arranged substantially in parallel, a connection portion 35c connecting both ends of the arms, and shafts 35d and 35e formed projecting from the respective ends of the arms. The member 35 is supported so as to be rotatable around the shafts 35d and 35e which are attached to the chassis 20.

Further, a projected follower 36 which engages with the cam groove 34 of the cam wheel 33 is provided so as to project from the base ascending/descending member 35 on the side opposite to the extension of the arms 35a and 35b. In the state in which the follower 36 is engaging with the upper cam groove 34b, the arms 35a and 35b are at a position rotated downward with the shafts 35d and 35e as the rotation axis. On the other hand, when the follower 36 is brought into engagement with the lower cam groove 34a via the inclined cam groove 34c according to the rotation of the cam wheel 33, the arms 35a and 35b move to a position rotated upward with the shafts 35d and 35e as the rotation axis.

The arms 35a and 35b of the base ascending/descending member 35 constructed as in the above are connected respectively to insulators 29b and 29c fitted to connection portions formed on both sides of the front portion of the base 23. Because of this, the front portion of the base 23 (mechanism unit 22) moves vertically between the raised position and the lowered position with the location of an insulator 29a situated on the back side of the main body 2 as the pivotal point in accordance with the pivotal movement of the arms 35a and 35b of the base ascending/descending member 35 which is caused by the rotation of the cam wheel 33.

The disc tray 5 includes a shallow concave disc supporting portion 5a for supporting an optical disc 3 (hereinafter, simply referred to as "disc" on occasion) thereon, and the rack gear is formed on the underside surface thereof (not shown in the drawing) such that it meshes with the upper gear 33b of the cam wheel 33. Consequently, as the cam wheel 33 is rotated by the rotation of the loading motor 31, the disk tray 5 is moved forward or backward with respect to the main body 2 between the disc unloading position (eject position) and the disc loaded position (playback position). In this case, as stated in the above, since the loading motor 31 is constructed so as to rotate in a constant speed with a constant voltage, the disc tray 5 also moves in a constant speed.

When the disc drive 1B is not in use, the disc tray 5 is housed within the main body 2 (at the disk loaded position). In this state, if an eject operation (unloading operation) is carried out, the motor 31 rotates in a prescribed direction, and the rotation of the motor 31 is transmitted to the cam wheel 33 with a reduced speed, whereby the cam wheel 33 is rotated in a counterclockwise direction in FIG. 1. This rotation of the cam wheel 33 causes the disc tray 5 to move forward and protrude to a position (the disc eject position) outside the main body 2 through the apertures 14f, 15a.

In this state, a disc 3 is placed in the disc supporting portion 5a of the disc tray 5, and a loading operation is then carried out, whereby the loading motor 31 rotates in the opposite direction, and this causes the cam wheel 33 to rotate in the opposite direction (anti clockwise direction in FIG. 1) via the rotational speed reduction mechanism 32. Consequently, the disc tray 5 is moved toward the back of the disc drive into the main body 2, through the apertures 14f, 15a, to the disc loaded position. In this way, the optical disc 3 which is placed at a prescribed position on the disc tray 5 is also transported to the disc loaded position in the main body 2.

Now, the following two operations are known as the loading operation of the disc. Namely, the first is the eject switch loading operation in which the eject switch 18 is turned on to rotate the loading motor 31 in the reverse direction so that the disc tray 5 is moved automatically to the disc loaded position. The second is the manual loading operation in which a switch 37 installed within the cam wheel 33 is operated by manually pushing the disc tray 5 to a specified position in the direction of an arrow A in FIG. 1. With this operation, the loading motor 31 is driven and thereafter the disc tray 5 is moved (loaded) automatically to the disc loaded position.

In the manual loading operation, when the disc tray 5 is pushed in manually, the cam wheel 33 has to be rotated forcibly because the rack of the disc tray 5 is in engagement with the cam wheel 33. Since the cam wheel 33 is connected to the loading motor 31 via the rotational speed reduction mechanism 32, the gears and the like of the rotational speed reduction mechanism 32 and the loading motor 31 have also to be rotated. Because of this, if the gear ratios of various gears of the cam wheel 33 and the rotational speed reduction mechanism 32 are high and therefore the rotational speed reduction ratios are also high, the force required for the manual operation becomes large.

Further, when the cam wheel 33 begins to rotate in the opposite direction, the follower 36 of the base ascending/descending member 35 relatively moves along the upper cam groove 34b and the center of the disc 3 approaches the central hub portion of the turntable 26, the follower 36 is displaced into the lower cam groove 34a so that the follower 36 is shifted downward, thereby the base ascending/descending member 35 is rotated around the axes 35d, 35e so that the arms 35a, 35b are displaced from the lower position to the upper position.

According to the displacement of the arms 35a, 35b, the front portion of the base 23 pivots about the position of the insulator 29a from the lowered position to the raised position through the insulators 29b, 29c, whereby the base 23 is placed in a roughly horizontal state.

In this way, the center portion 26a (center hub portion) of the turntable 26 is fitted into a center hole 3a of the optical disc 3 to support the optical disc 3 thereon, and at this time the disc clamp 38 is magnetically stuck to the turntable 26, thereby the optical disc 3 is held between the turntable 26 and the disc clamp 38. In this state, the spindle motor 25 is operated to rotate the optical disc 3 at a predetermined rotational speed, and then the information recorded on the optical disc is played back. If an eject operation is carried out while the rotation of the optical disc 3 is stopped, the operations of each mechanism of the disc drive 1B described above are carried out in reverse order and direction, thereby the clamp is released and then the optical disc 3 supported on the disc tray 5 is ejected.

As described in the above, in the disc drive 1B, the loading and ejecting operations of the optical disc 3 are carried out by moving the disc tray 5, in which the loading motor 31 is employed as a driving means. However, when the rotation of the optical disc 3 is interrupted by the halt of operation of various parts of the disc drive such as the motors because of the power failure or the like, in particular, when the power failure occurs during playing back the optical disc 3, it becomes not possible to eject the optical disc 3 by moving the disc tray 5. In order to avoid such a situation, there is provided an emergency eject mechanism 38 which makes it possible to manually move the disc tray 5 to eject the optical disc 3.

The emergency eject mechanism 38 is provided on the cam wheel 33. Describing it in more detail, as shown in FIG. 2 and FIG. 3, a plurality (three in this embodiment) of engaging pieces (projections) 38a, 38b, and 38c are provided in the peripheral space of the cam wheel 33 between the flange 331 and the lower gear 33a. Each of these pieces 38a, 38b, and 38c constitutes an engaging portion with which the tip of a rod-like slender operating member 39 can engage for the purpose of manually operating the cam wheel 33 to rotate it from the outside of the main body 2.

Here, if a power failure, for example, occurred during playback of the optical disc 3 and the disc tray 5 is stopped at the disc loaded position (inner-most portion) or its neighborhood, a pin 39a of the operating member 39 is inserted through the hole 15c of the front panel 15 into the inside of the main body 2 to cause its tip to be engaged with the engaging piece 38a, as shown in FIG. 2 and FIG. 3, and then the engaging piece 38a is manually pushed by the pin 39a in the direction of an arrow B in FIG. 2. As a result, the cam wheel 33 is rotated counterclockwise in FIG. 1 to cause the mechanism unit 22 move downward (that is a position where the disc tray 5 can be moved), and thereby disc tray 5 is slightly moved forward. In this case, the motor 31 is also forcibly rotated via the rotational speed reduction mechanism 32 in accordance with the rotation of the cam wheel 33. As described above, since the operation of the emergency eject mechanism is carried out by forcibly rotating the cam wheel by inserting the operating member from the outside of the disc drive, the burden on the manual operation is heavy when the gear ratio of the loading mechanism 30 is high.

As the cam wheel 33 is rotated to a certain extent, the front end portion of the disc tray 5 protrudes out of the aperture 15a, so the disc tray 5 can forcibly be moved to the eject position by gripping the projected portion with a hand and pulling it out forward. In this way, it becomes possible to take out the optical disc 3 placed on the disc tray 5.

In the prior art disc drive 1B with the above construction and operation, the moving speed of the disc tray 5 is determined by the rotational speed reduction ratio of the cam wheel 33 of the loading mechanism 30 and the rotational speed reduction mechanism 32 provided that the rotation of the loading motor 31 is constant. Here, what is meant by the "rotational speed reduction ratio" is the ratio of the number of rotations of the output on the driven side in a specified time to the number of rotations of the input on the driving side. In the case of this prior art disc drive, when the roller 32a fitted to the rotation shaft of the motor 31 and the wheel 32b are regarded as being some sorts of gears, the rotational speed reduction ratio means the ratio of the number of rotations of the cam wheel 33 to the number of rotations of the roller 32a within a specified time. In such a rotational speed reduction mechanism, the gear ratio of a pinion gear (not shown in the drawings) provided below the wheel 32b with respect to the large gear 32c and the gear ratio of the small gear 32d to the gear 33a below the cam wheel 33 are related to the speed reduction ratio. Therefore, when these gear ratios are high, the rotation of the motor 31 on the drive side is transmitted to the cam wheel 33 on the driven side with more reduction in the speed.

In the loading mechanism 30 of the prior art disc drive, there is a relation such that the moving speed of the disc tray 5 is decreased as the gear ratio of the loading mechanism is raised, and the moving speed of the disc tray 5 is increased as the gear ratio is lowered. In this case, if the moving speed of the disc tray 5 is too fast, it will give rise to various problems that will be described in detail later. Accordingly, in the prior art disc drives, the gear ratios are set at relatively high values to suppress the moving speed of the disc tray 5 at a relatively slow speed.

In this way, the gear ratios of the loading mechanism 30 are set at relatively high values in the prior art disc drives. Accordingly, the emergency eject operation in which the disc tray 5 is forcibly moved manually to the eject position by the use of the emergency eject mechanism 38, or the manual loading operation in which the disc tray 5 is pushed in manually to the specified position in the manual loading operation requires a large force to carry it out, which results in a problem in that the operability of thereof.

In other words, in the emergency eject operation, the slender pin 39a of the operating member 39 is inserted from the outside of the main body 2 of the disc drive 2 to directly and manually rotate the cam wheel 33, by which the various gears of the rotational speed reduction mechanism as well as the loading motor 31 are forcibly rotated. Accordingly, if the gear ratio of the rotational speed reduction mechanism 30 is high, the operation requires a large force. As a result, it leads to the problem that not only the emergency eject operation becomes less easy to carry out but also unreasonable loads are placed on the operating member 39, the cam wheel 33, and the like. In addition, in the emergency eject operation, the disc tray slightly stuck out of the main body 2 is forcibly withdrawn, in which case a large force is required also.

Moreover, in the manual loading operation, when the disc tray 5 is pushed in manually, the cam wheel 33, various gears of the rotational speed reduction mechanism 32 and the loading motor 31 are forcibly rotated also via the rack of the disc tray 5. Consequently, if the gear ratios of the loading mechanism 30 are high, the manual loading operation becomes less easily feasible, and the force required for pushing in the disc tray 5 becomes large accordingly. As a result, an excessive force might be applied to the disc tray 5, thereby placing an unreasonable load on the loading mechanism 30.

These problems can be resolved by reducing the gear ratios of the loading mechanism 30. However, if the gear ratios of the loading mechanism 30 are reduced, the moving speed of the disc tray 5 becomes fast on the contrary, which gives rise to the problem of the durability of the disc 3 and the loading mechanism 30 because of the excessive load on them. Namely, since the moving speed of the disc tray 5 is held at a constant level during the loading operation owing to the fact that the loading motor 31 is driven at a specified number of rotations by the constant voltage of the loading motor 31, if the moving speed of the disc tray 5 is fast, heavy loads are imposed momentarily on the disc 3 and the loading mechanism 30 when the disc tray 5 is stopped.

Accordingly, in the prior art disc drives, the gear ratio of the loading mechanism 30 is designed to be relatively high such that the speed reduction ratio is high in spite of the drawback that a large force is required for the emergency eject operation and the manual loading operation.

SUMMARY OF THE INVENTION

In view of the problems in the prior art disc drive described above, it is a main object of the present invention to provide a disc drive which can improve the operability in the emergency eject operation and the manual loading operation without imposing a heavy load on the disc and the loading mechanism.

It is another object of the present invention to provide a disc drive in which the gear ratio of the loading mechanism can be reduced without imposing a heavy load on the disc and the loading mechanism, and a method of driving a loading motor in the disc drive.

In order to achieve the main object, the disc drive according to the present invention includes a disc drive main body having a playback or recording/playback mechanism of a disc, a disc tray which is constructed so as to support the disc thereon and is movable with respect to the disc drive main body between a disc eject position and a disc loaded position, and a driving means provided in the disc drive main body for driving the disc tray, wherein the moving speed of the disc tray is variable.

According to the disc drive of this invention, it is constructed to make the moving speed of the disc tray variable, so that it is possible to prevent a situation in which a heavy load is imposed on the disc and the loading mechanism when the disc tray is stopped by appropriately varying the moving speed of the disc tray.

In the present invention, the driving means is composed of a motor, and the moving speed of the disc tray can be varied by changing the number of rotations of the motor.

With this arrangement, it is possible to control the moving speed of the disc tray in a simple and precise manner.

Preferably, the disc drive has a motor driver for driving the motor, and the motor is driven by rectangular pulses from the motor driver, in which the number of rotations of the motor can be varied by changing the on/off widths of the rectangular pulses.

In this way, the number of rotations of the motor can be simply and precisely controlled, and therefore it is possible to freely control the moving speed of the disc tray via the motor driver.

Further, it is preferred that the moving speed of the disc tray is decreased in a stepwise manner over the period from the start to the stop of the disc tray movement.

In this way, it is possible to lower the load to be imposed on the disc, the loading mechanism and the like at the time of stop of the disc tray even when the moving speed at its start is fast.

In this case, the moving speed of the disc tray can be varied in a decreasing stepwise manner over the path from the loaded position to the eject position.

By so doing, the moving speed of the disc tray can be reduced in a stepwise manner over the period from the start of the ejecting operation to its completion, so that it is possible to avoid that a large instantaneous load is imposed on the disc and the loading mechanism and the like when the disc tray stops at the eject position.

Alternatively, the moving speed of the disc tray may be varied in a decreasing stepwise manner over the path from the eject position to the loaded position.

By so doing, the moving speed of the disc tray can be reduced in a stepwise manner over the period from the start of loading to its completion, so that it is possible to avoid a large instantaneous load is to be imposed on the disc and the loading mechanism and the like when the disc tray stops at the loaded position.

The disc drive is equipped with at least a turntable on which the disc is placed and a pick-up for recording or recording/playback of the disc, and has a mechanism unit which can be shifted between a raised position where the disc is held by the turntable and a lowered position below the raised position, and a loading mechanism for operating the mechanism unit and the disc tray. The loading mechanism has a speed reduction mechanism which includes a plurality of gears for transmitting a reduced rotation of the driving means to the mechanism unit and the disc tray, where the gear ratio of the rotational speed reduction mechanism is set at a relatively low level.

By setting the gear ratio of the rotational speed reduction mechanism at a relatively low level, it is possible to give a moving speed of the disc tray which is faster compared with that of the conventional disc tray. Further, since the moving speed of the disc tray can be varied, it is possible to realize a high speed movement of the disc tray without increasing the load to be imposed on the disc, the loading mechanism and the like.

Another aspect of the present invention is directed to a disc drive which comprises a disc drive main body; a disc tray which is constructed to support a disc thereon and which is movable with respect to the disc drive main body between a disc eject position and a disc loaded position; a mechanism unit which is provided in the disc device main body having at least a turntable for rotating the disc and a pick-up for recording or recording/playback of the disc and which can be shifted between a raised position where the disc is supported by the turntable and a lowered position situated below the raised position; a loading mechanism installed in the disc drive main body for moving the disc tray between the disc eject position and the disc loaded position, and for shifting the mechanism unit between the raised position and the lowered position; and a loading motor for actuating the loading mechanism and for moving the disc tray and the mechanism unit; wherein the loading mechanism is provided with a rotational speed reduction mechanism composed of a plurality of gears for transmitting the rotation of the loading motor with reducing its speed to move the disc tray and the mechanism unit via the gears on the driven side of the rotational speed reduction mechanism; wherein the gear ratio of the speed reduction gears of the loading mechanism is set at a relatively low level and the loading motor is constructed so as to be able to vary its rotational speed.

With this arrangement, the size of various gears constituting the rotational speed reduction mechanism of the loading mechanism need not be made so large, so that it is possible to make the overall design of the loading mechanism compact. Moreover, in this invention, the rotational speed of the motor is variable, so it is possible to adjust the moving speed of the disc tray even if the gear ratio of the rotational speed reduction mechanism is set at a low level to make the moving speed of the disc tray fast.

The disc drive has a motor driver for driving the loading motor, and the loading motor is arranged to be driven by rectangular pulses from the motor driver, so that the number of rotations of the loading motor can be varied by changing the on/off widths of the rectangular pulses.

In this way, the number of rotations of the loading motor of the loading mechanism can be precisely and freely controlled via the motor driver.

Preferably, the moving speed of the disc tray is varied so as to be decreased in a stepwise manner over the period from the start of the movement to the stop of the disc tray.

In this way, even if the moving speed of the disc tray is set at high level, it is possible to move the disc tray at a high speed without increasing the load on the disc and the loading mechanism and the like which is caused at the stop of the disc tray.

In this invention, the disc drive is equipped with a manual loading mechanism in which the loading motor is turned on by manually pushing in the disc tray to a specified position from the eject position, and thereafter the disc tray is moved automatically to the disc loaded position.

In this case, since the gear ratio of the rotational speed reduction mechanism is set at a low level, even in such a manual operation of pushing in the disc tray to the specified position, it is possible to turn on the loading motor without need of an unreasonable force for pushing the disc tray.

The disc drive is so constructed as to be able to move the disc tray from the disc loaded position toward the disc eject position by manually operating the loading mechanism, via the operating member, from the outside of the device main body, thereby enabling to shift the mechanism unit from the raised position toward the lowered position.

In this connection, there may happen a case in which because of the power failure or the like the loading motor of the drive mechanism stops working, leaving the mechanism unit at the raised position, and making it impossible to take out the optical disc. Even in such a case, the operation of manually driving the loading mechanism by means of the emergency eject mechanism can be carried out with ease because of the gear ratio of the rotational speed reduction mechanism being set at a low level, thus making it possible to improve the operability and avoid the imposition of an unreasonable load on the disc drive.

Moreover, in order to achieve the above-mentioned objects, the driving method of the loading motor in the disc device according to this invention has the following feature. Namely, the disc drive comprising a disc tray which is constructed to support a disc thereon and is movable with respect to the disc drive main body between a disc eject position and a disc loaded position, and a loading motor provided in the disc drive main body for moving the disc tray, in which the loading motor is driven by means of rectangular pulses with the on/off widths changed in order to vary the moving speed of the disc tray.

In such a driving method of the loading motor according to this invention, it is possible to simply and precisely control the number of rotations of the motor by varying the number of rotations of the loading motor by appropriately changing the on/off widths of rectangular pulses of the supply voltage (driving voltage) for the loading motor.

The loading motor is driven so as to decrease the moving speed of the disc tray in a stepwise manner over the period from the start to the stop of movement of the disc tray.

By employing such a driving method of the loading motor, it is possible to reduce the moving speed of the disc tray before the disc tray is brought to a stop, thus enabling to prevent the imposition of a load on the loading mechanism and the disc and the like.

Other objects, structures and results of the present invention will be apparent when considering the following description of the preferred embodiments in conjunction with the appended drawings.

BRIEF DESCRIPTION OF THE DRAWINGS

FIG. 13 is a timing chart which shows the driving control method of the loading motor of the present invention.

DETAILED DESCRIPTION OF THE PREFERRED EMBODIMENTS

A detailed description of the preferred embodiments of a disc drive and a method of driving a loading motor of the disc drive according the present invention will now be given below with reference to the appended drawings. In this connection, it is to be noted that the same reference numbers will be used for the parts or components of the present invention that are the same or similar to the parts or components of the prior art disc drive described above.

Figure 4:
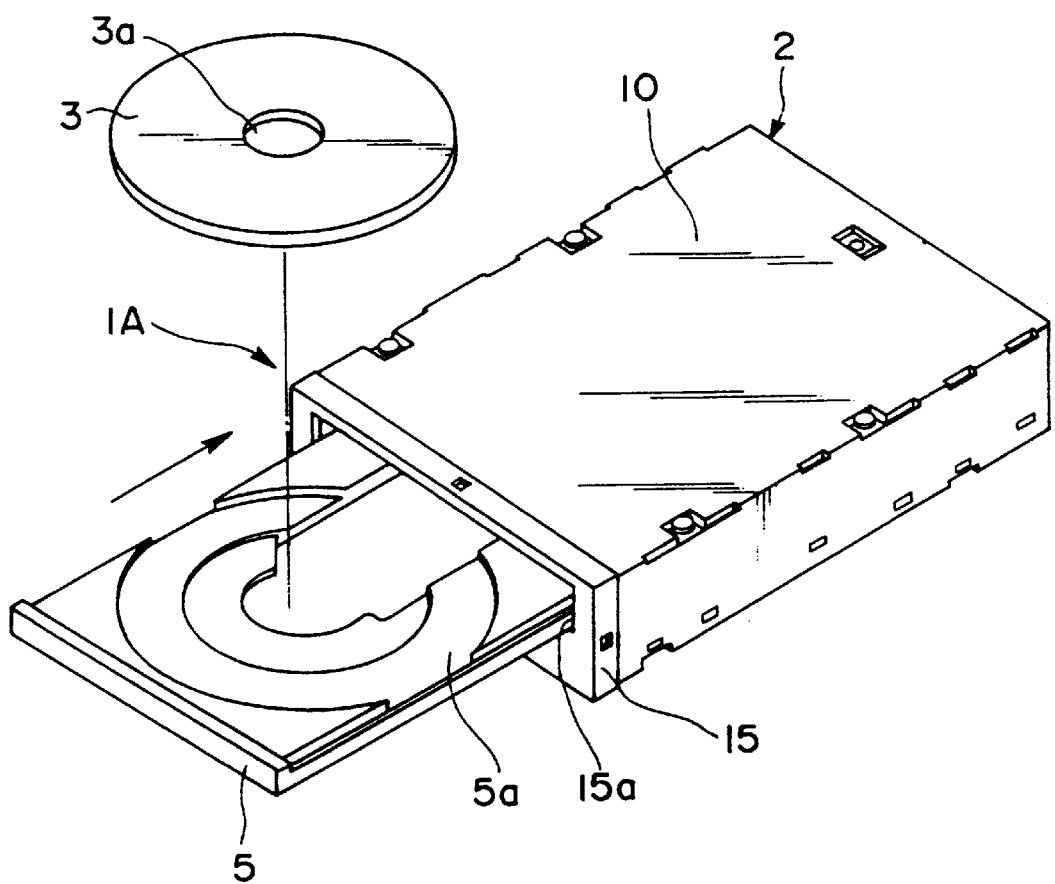
FIG. 4 is a perspective view of the disc drive according to the present invention.

FIG. 4 is a perspective view of an embodiment of a disc drive 1A according to the present invention. As shown in FIG. 4, the disc drive 1A of the present invention is a device for playing back or recording and playing back an optical disc 3, such as CD-ROM, CD-R or audio CD, as is the same with the prior art device shown in FIGS. 1 and 2. The disc drive 1A is roughly constructed from a main body 2, and a disc tray 5 which moves in the forward and backward direction (horizontal direction) with respect to the main body 2 in order to transport the optical disc 3.

Figure 1:
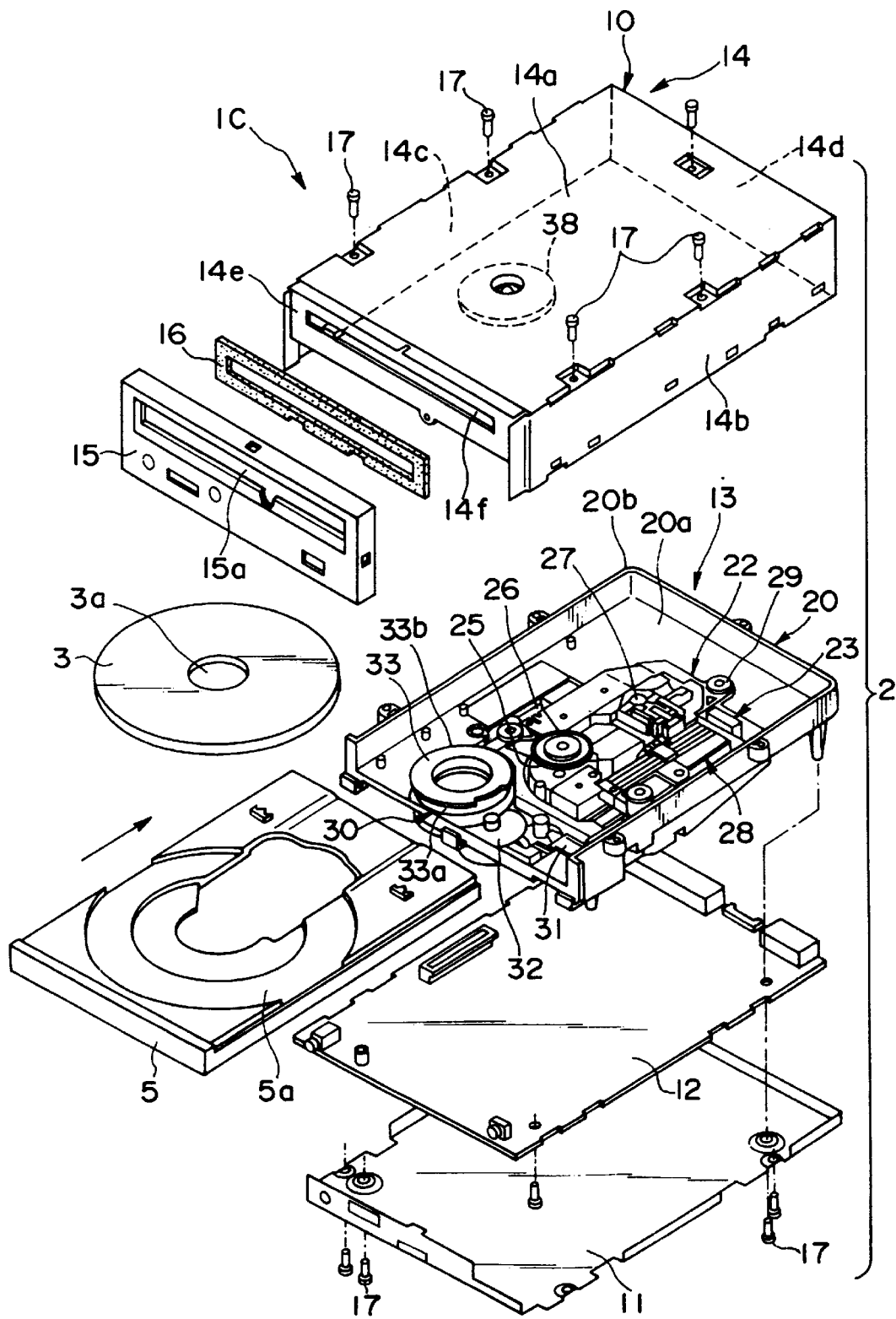
FIG. 1 is an exploded perspective view of a prior art disc drive.

The disc drive main body 2 is composed of, in the same manner as the prior art shown in FIG. 1, a circuit substrate assembly (not shown in the drawings) and a mechanism assembly 13 provided above the circuit substrate assembly, and they are housed in a casing 10.

The casing 10 is constructed from a plurality of metal plates, with the front portion thereof being provided with a front panel 15 having an aperture 15a. Below the aperture 15a of the front panel 15, there is provided an eject switch 18.

Figure 5:
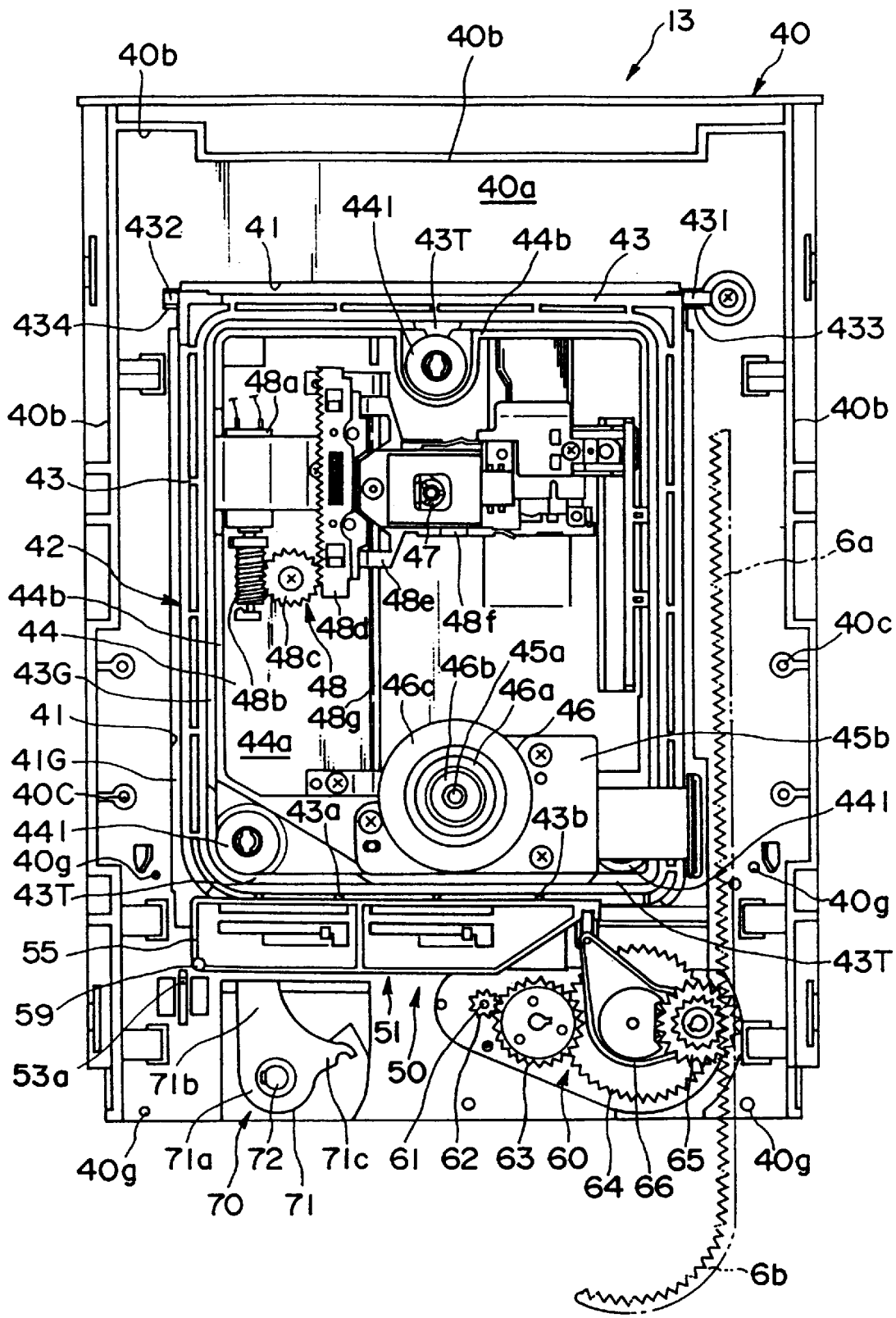
FIG. 5 is a top plan view of the main body of the disc drive according to the present invention in FIG. 4, in which the mechanism unit is shown in its lowered position.
Figure 6:
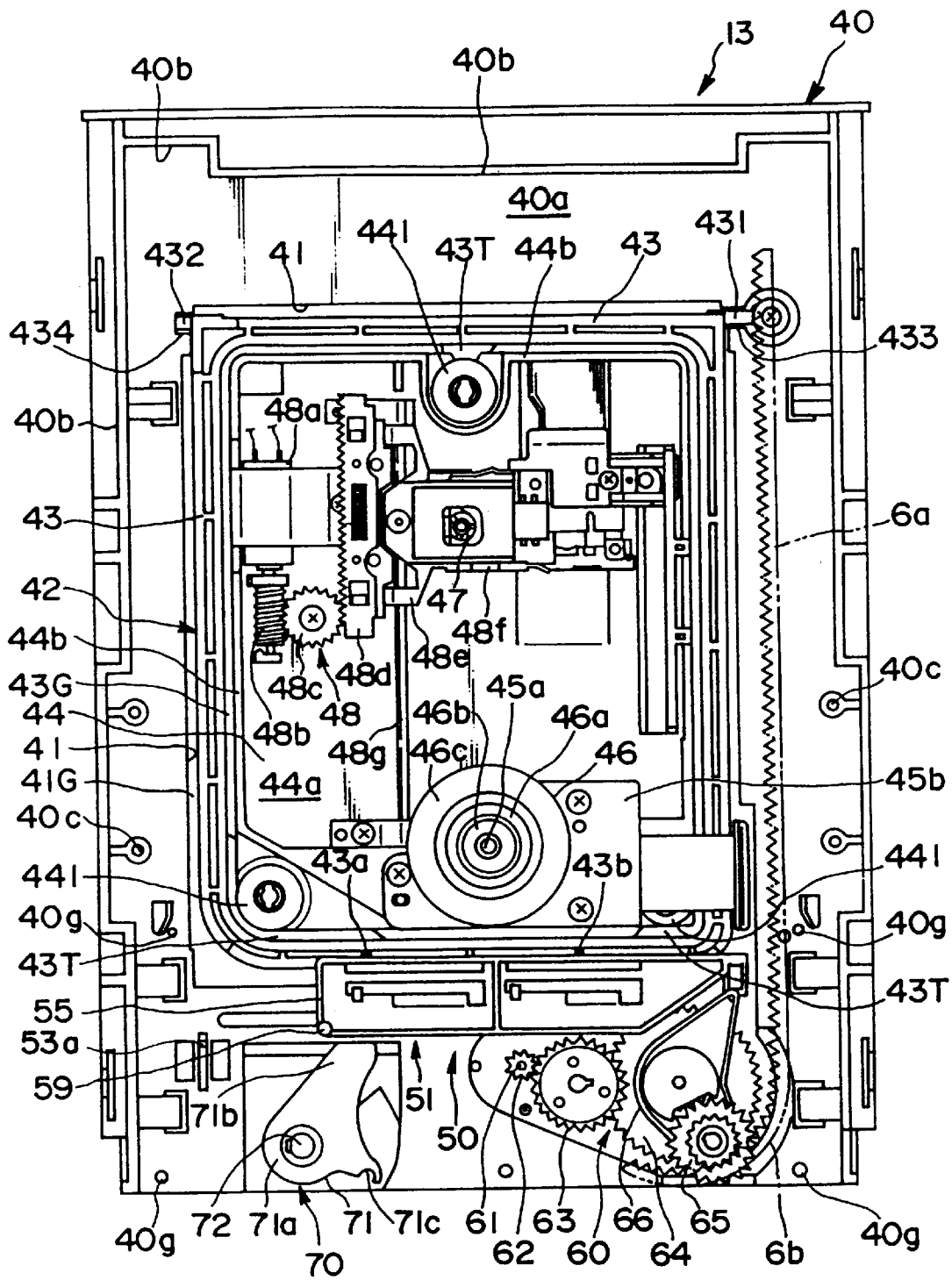
FIG. 6 is a top plan view of the main body of the disc drive according to the present invention, in which the mechanism unit is shown in its raised position.

FIG. 5 is a top plan view of the main body 2 of this embodiment from which the casing 10 is removed, and it shows the state that the mechanism unit is in the descending position (lowered position). FIG. 6 is another top plan view of the main body of the embodiment, and it shows the state that the mechanism unit is in the ascending position (raised position).

As shown in FIGS. 5 and 6, the mechanism assembly of the main body 2 which is housed inside the casing 10 includes a chassis 40 which is shaped roughly like a container and which is preferably constructed from a hard resin. The chassis 40 is constructed from a roughly rectangular-shaped bottom portion and a U-shaped wall portion 40a which stands erect along the left, right and back edge portion of the bottom portion 40a.

In this way, no wall portion is formed in the front of the chassis 40 in order to allow the front of the chassis to be open. Further, when the mechanism assembly 13 is assembled into the casing 10, the open front portion of the chassis 40 is aligned with the aperture 15a of the front panel 15 provided on the casing 10, and the disc tray 5 is moved into and out of the main body 2 through the aperture 15a.

As shown in FIG. 4, the disc tray 5 is provided with a shallow concave disc supporting portion 5a into which the optical disc 3 is placed to enable the optical disc 3 to be transported to a prescribed disc loaded position (disc playback position).

Figure 7:
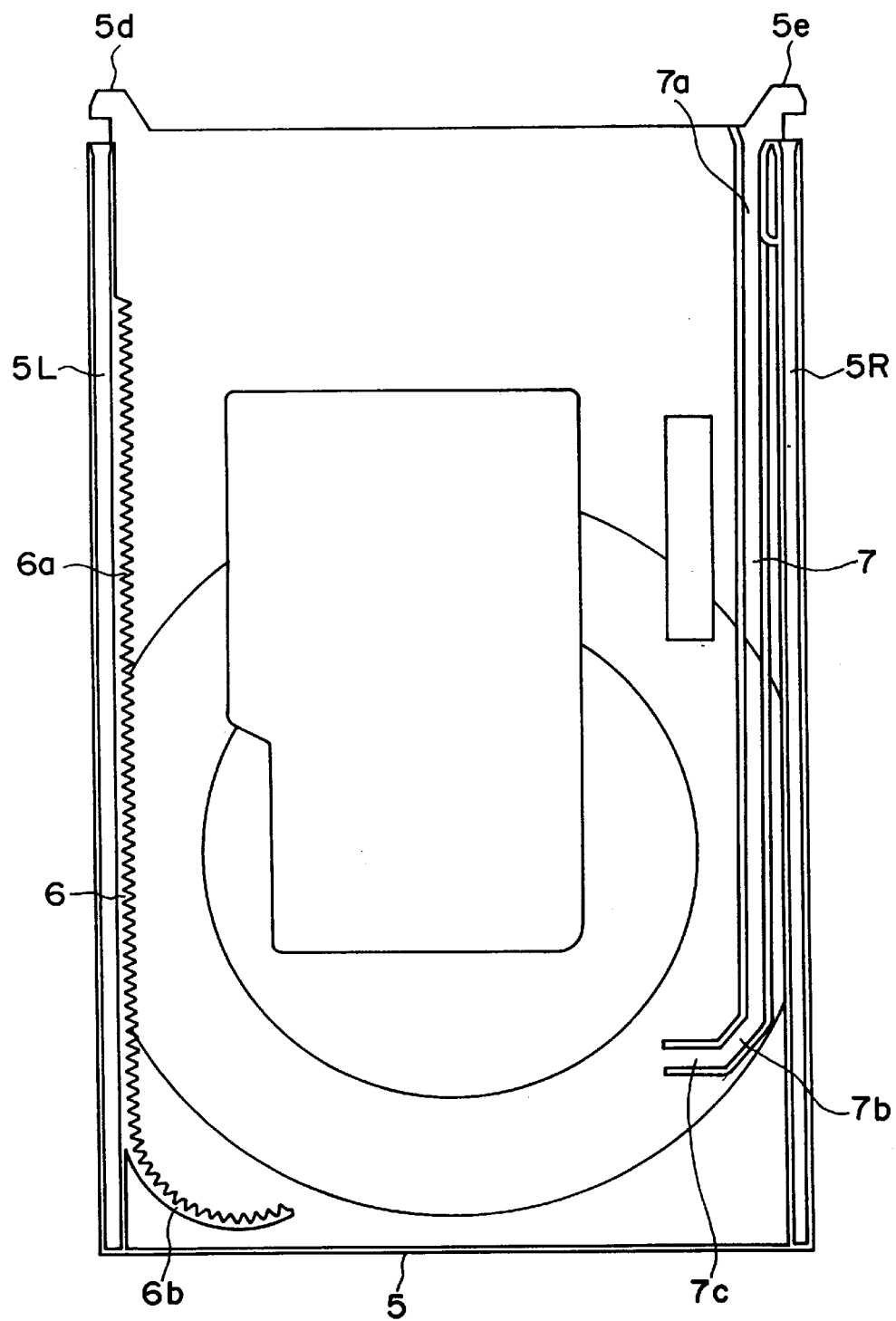
FIG. 7 is a bottom view which shows the structure of the underside surface of the disc tray of the disc drive according to the present invention.

As shown in FIG. 7, on the left and right portions of the bottom portion 40a of the chassis 40, there are provided with protruding guide members 40g, 40g (FIGS. 5, 6) which respectively engage with guide grooves 5L, 5R formed in left and right side portions of the underside surface of the disc tray 5. Further, the underside surface of the disc tray 5 is further provided with a rack gear 6 which includes a first rack 6a which extends straight in the forward and backward direction along the guide groove L and a roughly 90 degree arc-shaped second rack 6b which is formed at the front end portion (the front side of the disc tray 5 which is shown in the lower portion of FIG. 7) of the first rack 6a so as to be continuous therewith.

Further, as shown in FIGS. 5 and 6, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree with respect to the first movement restricting groove.

Further, as shown in FIGS. 5 and 6, the chassis 40 is provided with a mechanism unit 42 equipped with a turntable 46 for rotating an optical disc 3, an optical head (optical pick-up) 47 for playing back or recording and playing back the optical disc 3. The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between the raised position (upper position; FIG. 6) in which the optical disc 3 is supported on the turntable 46 and the lowered position (lower position; FIG. 5) which is lower than the raised position.

In particular, as shown in FIGS. 5 and 6, the mechanism unit 42 includes a base frame 43 constructed preferably from hard resin, and a support member (support plate) 44 which supports the base frame 43 via an elastic member (insulator) 441.

The base frame 43 is formed so as to have a roughly rectangular shape which includes a front portion and a rear portion. Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner side walls of the chassis 40. By supporting the rear portion of the mechanism unit 42 with the axles 431, 432 in this way, the front portion of the mechanism unit 42 is able to pivot with respect to the chassis 40 between the lowered position shown in FIG. 5 and the raised position shown in FIG. 6.

Figure 9:
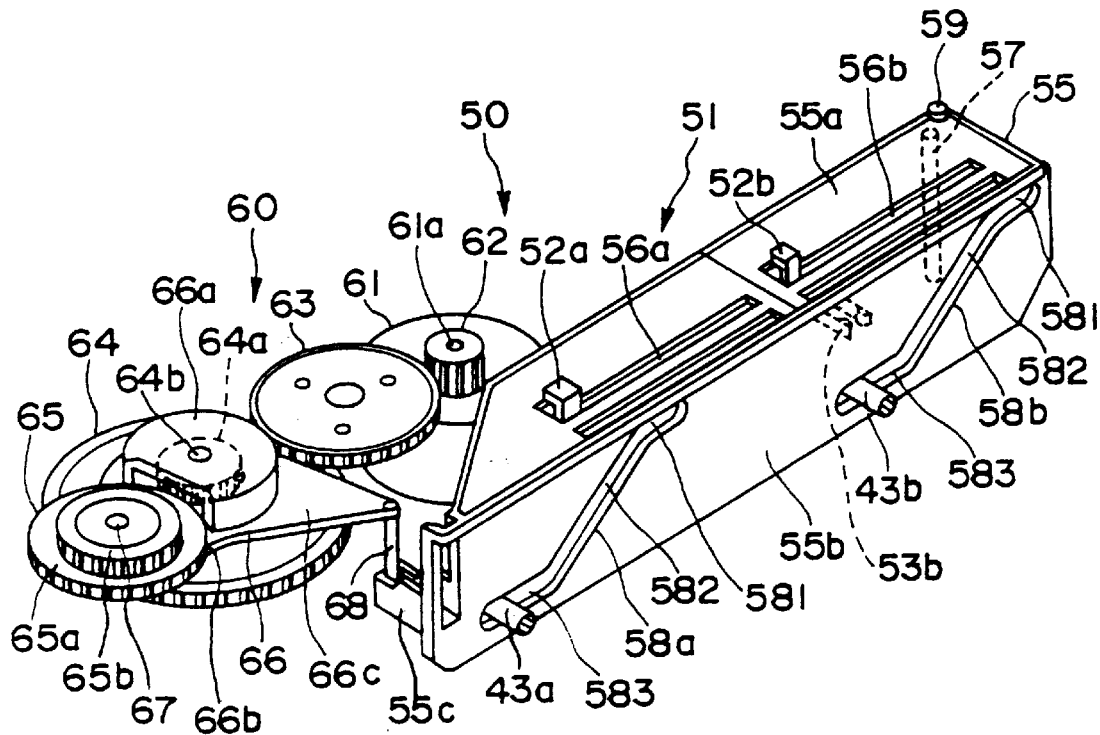
FIG. 9 is a perspective view which shows the structure of a cam mechanism of the disc drive according to the present invention, in which the cam mechanism is shown in its first position.
Figure 10:
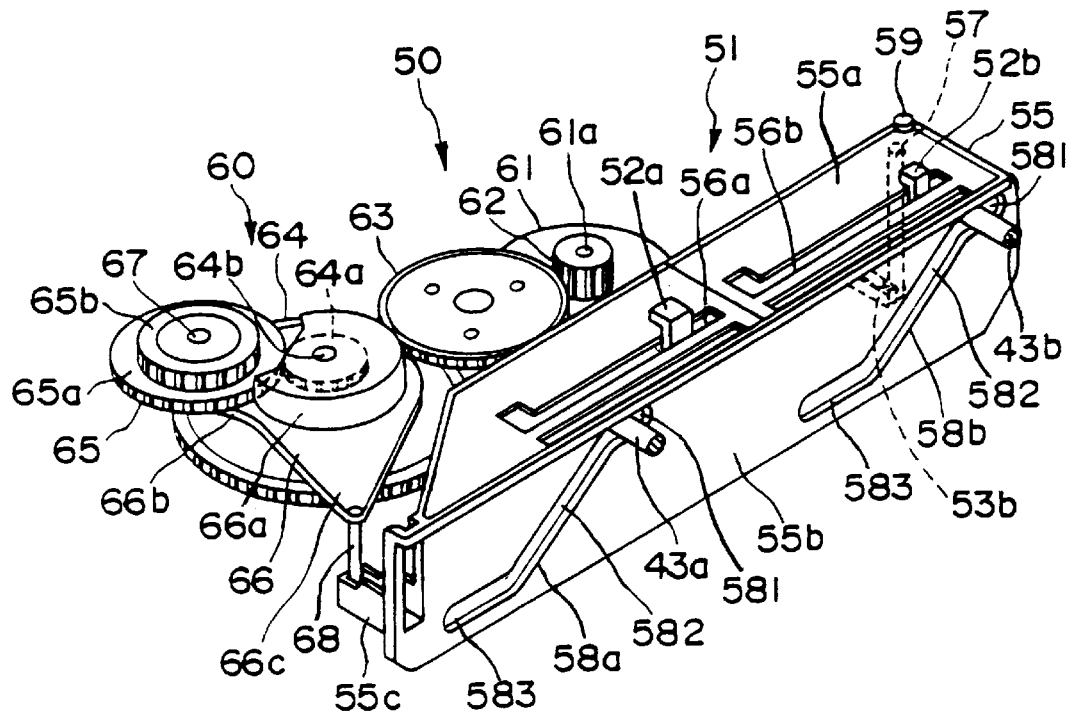
FIG. 10 is a perspective view which shows the structure of a cam mechanism of the disc drive according to the present invention, in which the cam mechanism is shown in its second position.

Further, a pair of protruding guide pins 43a, 43b are formed on the front of the base frame 43 (See FIGS. 9 and 10). These guide pins 43a, 43b are passed through a pair of guide slots (not shown in the drawings) formed in the wall of the front portion of the chassis 30 which defines the opening 41 of the chassis 40, respectively, and engaged with cam grooves 58a, 58b of a cam member 55 of a cam mechanism 51 (described hereinbelow) such that the front portion of the base frame 43 can be guided up or down according to the displacement of the cam mechanism 55.

Taking the possibility of deformation (thermal deformation or the like) of the chassis 40 into account, a spacing 41G is provided between the base frame 43 and the chassis 40 which defines the opening 41 Specifically, this spacing 41G is provided around roughly the entire circumference of the base frame 43. With this result, the pivotal movement of the base frame 43 will not be hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the base frame 43 such that the wall portion 44b is arranged inside the frame of the base frame 43 via a prescribed spacing 43G. The support member 44 is supported by the base frame 43 via the elastic members (insulators) 441 provided on tabs 43T formed at the left and right corner portions of the front side of the base frame 43 and at roughly the middle of the rear portion of the base frame 43. Namely, the support member 44 is supported by the base frame 43 via the elastic members 441 provided at three points which roughly form an isosceles triangle.

Figure 8:
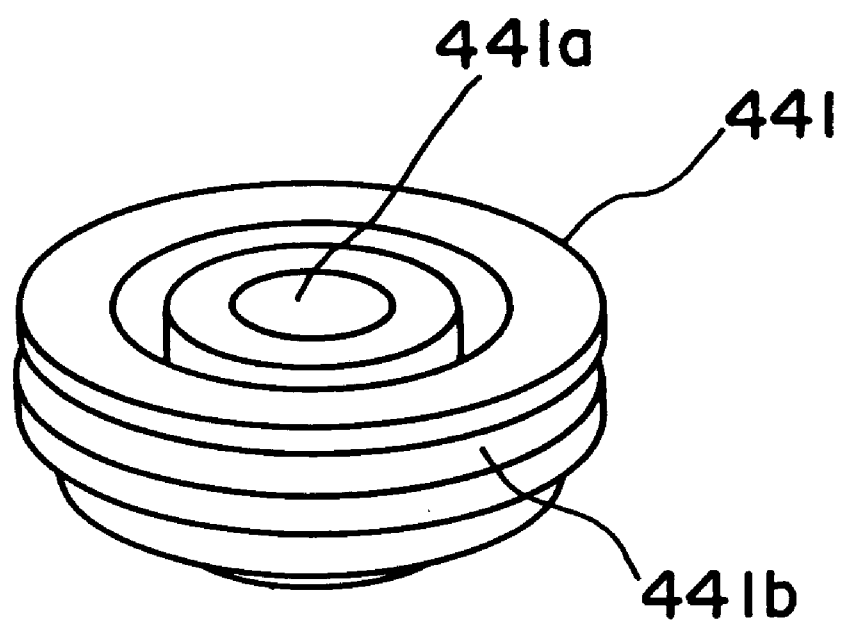
FIG. 8 is a perspective view of an elastic member used in the disc drive according to the present invention.

As shown in FIG. 8, each elastic member 441, which is formed from an elastic material such as rubber or the like, has a roughly cylindrical shape and includes a center hole 441a and a groove 441b formed in the outer circumferential surface in the circumferential direction thereof. Further, when the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44.

Further, as shown in FIGS. 5 and 6, the support member 44 is provided with a spindle motor 45 for rotating an optical disc 3, a turntable 46 fixed to a rotation axis 45a of the spindle motor 45, and an optical pick-up (optical head) 47 (which includes an actuator), and an optical pick-up moving mechanism 48 for moving the optical pick-up 47 in the radial direction of the optical disc 3. The spindle motor 45 is capable of rotating the optical disc 3 at a high rotational speed, for example, at a speed capable of rotating the optical disc 3 at 200–6400 rpm.

The turntable 46 is a disc-shaped member which includes a protruding ring-shaped center hub 46a formed in the center portion of the turntable 46. This center hub 46a is adapted to fit into a center hole 3a of the optical disc 3. Further, the center hub 46a is formed so as to taper from the tip to the base in order to prevent the optical disc 3 from slipping off center when being placed on the turntable 46. Further, a ring-shaped permanent magnet 46b for creating an attraction force on a disc clamp (described below) is provided in the center hub 46a in the circumferential direction of the rotation axis 45a of the spindle motor 45.

Further, a ring-shaped pad 46c is bonded to the upper part of the turntable 46 (i.e., the side used to support the optical disc 3) around the circumference of the center hub 46a. The pad 46c is made from an elastic material, such as various rubbers, soft resins or porous materials (sponges), which is constructed so as to have a relatively high coefficient of friction in order to prevent the optical disc 3 from slipping.

The optical pick-up 47 is a flat type optical pick-up constructed so as to deflect light reflected from the optical disc 3 by roughly 90 degrees using a mirror (or prism) or the like to guide such light toward a light gathering element such as a photodiode or the like.

As shown in FIGS. 5 and 6, the optical pick-up moving mechanism 48 is constructed from a sled motor 48a capable of forward/reverse rotation, a worm 48b which is attached to the rotational axis of the motor 48a, a worm wheel 48c which meshes with the worm 48b, a rack gear 48d which meshes with the worm wheel 48c, a slider 48e which is fixed to the rack gear 48d, a guide rod 48g which regulates the direction of movement of the slider 48e, and a pick-up support (pick-up base) 48f which is integrally formed with the slider 48e. The optical pick-up 47 is provided on the pick-up support 48f. Further, the worm 48b and the guide rod 48g are arranged so that their lengthwise directions are directed roughly parallel to the forward and backward direction of the disc drive 1A.

In this type of optical pick-up moving mechanism 48, if the worm 48b is rotated in a prescribed direction by the motor 48a, this rotation is transmitted through the worm wheel 48c and the rack gear 48d to the slider 48e, and this force causes the slider 48e to move along the guide rod 48g in the forward-backward direction of the disc drive 1A, whereby the optical pick-up 47 fixed to the pick-up support 48f is moved in the radial direction of the loaded optical disc 3. In this construction, the optical pick-up 47 and the optical pick-up moving mechanism 48 form a playback or playback and recording means.

Figure 12:
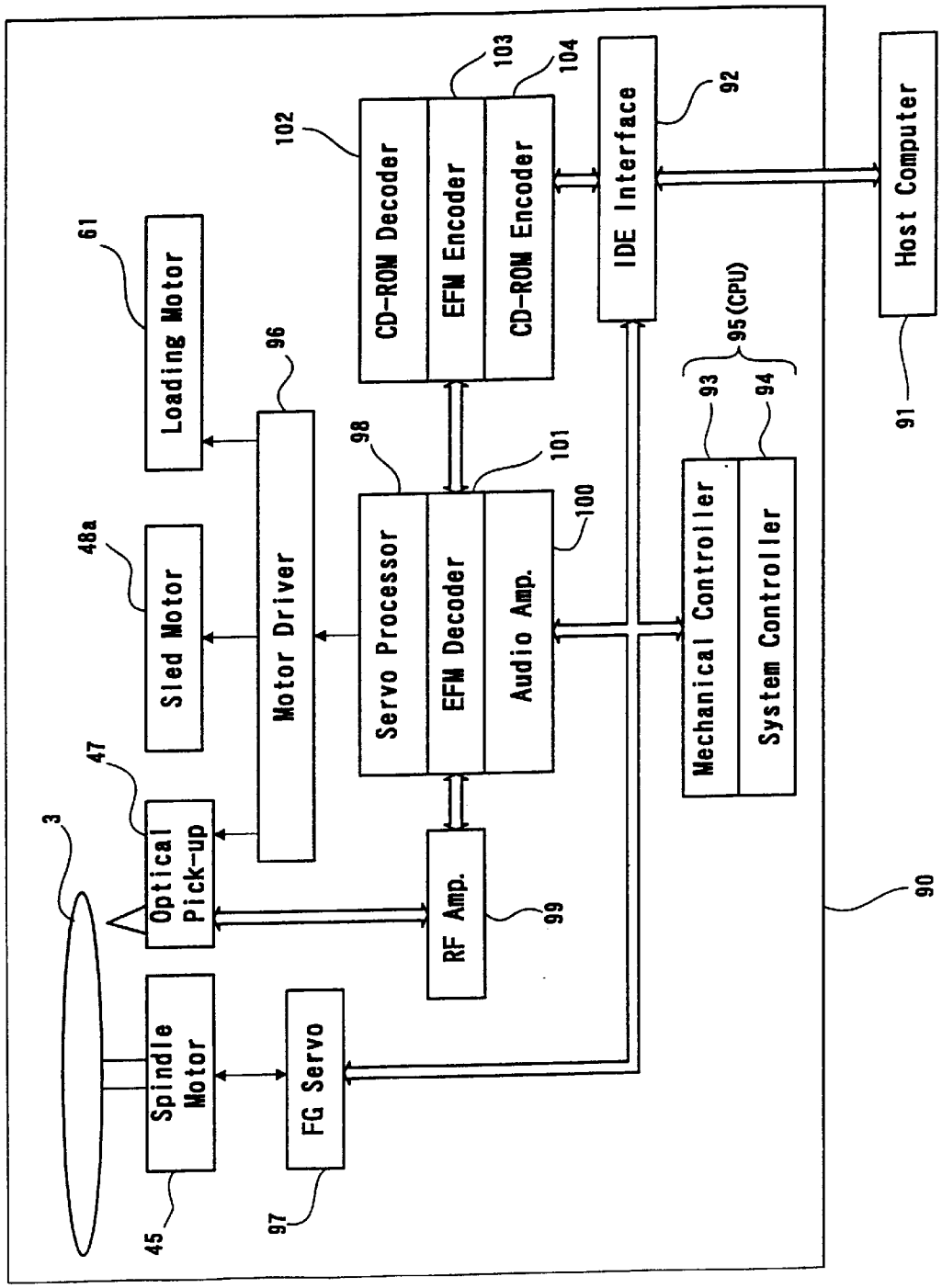
FIG. 12 is a block diagram which shows the driving control section of the disc drive according to the present invention.

It is to be noted that the spindle motor 45 and the motor 48a for moving the optical pick-up are controlled, along with the loading motor 61 described later, by a control means (CPU) and a motor driver, as shown in FIG. 12.

As shown in FIG. 5 and FIG. 6, a loading mechanism 50 for shifting the mechanism unit 42 between the lowered position (FIG. 5) and the raised position (FIG. 6), and for moving the disc tray between the loaded position and the eject position, is provided in front of the mechanism unit 42. The loading mechanism 50 has a cam mechanism 51 provided so as to be cooperated with the mechanism unit 42 and constructed to be movable between a first position (FIG. 5) and a second position (FIG. 6), and a driving mechanism 60 for moving (driving) the disc tray 5 and the cam mechanism 51.

The cam mechanism 51 can be operated to move the mechanism unit 42 to either the lowered position when the cam mechanism is in the first position shown in FIG. 5, or the raised position when the cam mechanism is in the second position shown in FIG. 6. In more details, as shown in FIGS. 9 and 10, the cam mechanism 51 includes a cam member 55 arranged so as to be slidably displaceable between a first position (FIG. 9) and a second position (FIG. 10) in the sideways direction with respect to the chassis 40 (i.e., the horizontal direction orthogonal to the direction of movement of the disc tray 5). The cam member 55 is constructed from a roughly plate-shaped horizontal portion 55a and a plate-shaped vertical portion 55b which is integrally formed with one lengthwise edge of the horizontal portion 55a so as to make a structure having a roughly L-shaped cross section.

Formed on the horizontal portion 55a of the cam member 55 are sideways guide grooves 56a, 56b which engage respectively with a pair of protrusions 52a, 52b which protrude from the top of the front portion of the chassis 40. Further, the underside surface of the horizontal portion 55a is provided with an engaging pin 57 which is inserted into an elongated slot formed in the top of the front portion of the chassis 40. This engaging pin 57 is engaged with an emergency eject mechanism (described below), and cooperated therewith.

Further, the vertical portion 55b of the cam member 55 is positioned to face the front wall which defines the opening 41 of the chassis 40. Formed in the vertical portion 55b are a pair of cam grooves 58a, 58b each having the same shape. Each of the cam grooves 58a, 58b is constructed from a horizontally extending upper groove 581 and lower groove 583 and a slanting groove 582 which connects the upper groove 581 and lower groove 583.

Further, the guide pins (following members) 43a, 43b adapted for insertion into the cam grooves 58a, 58b, respectively, are protrudingly provided on the front surface of the base frame 43 of the mechanism unit 42 as described above. In this way, when the cam member 55 is moved between the first position and the second position, the guide pins 43a, 43b are moved by the slide abutment with the cam grooves 58a, 58b in the up and down direction.

Namely, when the cam member 55 is positioned at the first position, the guide pins 43a, 43b are engaged with the lower grooves 583 (FIG. 9), and the front portion of the mechanism unit 42 is in the lowered position shown in FIG. 5. When the cam member 55 is moved from the first position to the second position, the guide pins 43a, 43b move up by the slanting grooves 582, thereby causing the front portion of the mechanism unit 42 to move from the lowered position toward the raised position. Then, when the cam member 55 reaches the second position, the guide pins 43a, 43b engage with the upper grooves 581 (FIG. 10), and the front portion of the mechanism unit 42 is displaced to the raised position shown in FIG. 6.

Further, a protrusion 59 is integrally formed on an end portion of the horizontal member 55a of the cam member 55 to engage with the cam member movement restricting groove 7 formed in the underside surface of the disc tray 5. As a result, when the protrusion 59 is engaged with the first movement restricting groove 7a of the disc tray 5, the cam member 55 is prevented from moving in the sideways direction, whereby the cam member 55 is held at the first position. Then, in accordance with the movement of the disc tray 5, the protrusion 59 slides from the first movement restricting groove 7a to the second movement restricting groove 7b, and upon moving through this slanting groove, the cam member 55 is displaced within the range of the lower grooves 583 of the cam grooves 58a, 58b of the cam member 55. Then, when the protrusion 59 reaches the position of the third movement restricting groove 7c, the cam member 55 is allowed to move toward the second position.

As shown in FIGS. 9 and 10, the drive mechanism 60 of the loading mechanism 50 includes a loading motor 61 which is a DC motor capable or forward/reverse rotation provided on the underside surface of the front portion of the chassis 40, a pinion gear 62 mounted on a rotation axis 61a of the motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxially therewith.

Meshing with the small gear 64a of the third gear 64 is an operative gear 65 which meshes with the first and second racks 6a, 6b of the disc tray 5. Namely, the operative gear 65 includes a lower gear 65a which meshes with the small gear 64a of the third gear 64, and an upper gear 65b which meshes with the rack 6 of the disc tray 5, in which the upper gear 65b being integrally formed on the same axis as the lower gear 65a.

In the present embodiment, the gears 62–65 are flat teeth gears, which constitute a rotational speed reduction mechanism for the loading motor 61 of the loading mechanism 50. Namely, the rotational speed of the loading motor 61 on the driving side is reduced between the pinion gear 62 and the second gear 63 which form a first pair of speed reduction gears, the rotation of the second gear 63 is reduced between a small gear fixed coaxially to below the second gear 63 and the third gear 64 which form a second pair of speed reduction gears, and the rotation of the third gear 64 is further reduced between the small gear 64a formed integrally above the third gear 64 and the lower gear 65a of the operative gear 65 which form a third pair of speed reduction gears. In this way, the rotational speed of the loading motor 61 is reduced, and thus reduced rotation is transmitted to the operative gear 65, and the upper gear 65b of the operative gear 65 is engaged with the first and second racks 6a and 6b of the disc tray 5.

Although, in all of these gear pairs, the gear ratio of the gear on the driven side to the gear on the driving side is set to be high, the gear ratio of the rotational speed reduction mechanism as a whole is set to be lower than the gear ratio of the prior art loading mechanism 30. As can also be seen from the difference between the prior art cam wheel 33 and the operative gear 65 of this embodiment, the design of the loading mechanism of this embodiment eliminates the need for making the various gears constituting the rotational speed reduction mechanism of the loading mechanism to be so large in size, and thereby permits a generally compact design for the loading mechanism 50.

The operative gear 65 is provided so as to be capable of rotation on a rotation axis 67 provided on a planetary arm 66 mounted to a rotation axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 to which the operative gear 65 is rotatably mounted. Namely, the operative gear 65 rotates about the axis 67 of the first arm 66b which functions as a rotation axis thereof as well as the operative gear 65 also turns around the axis 64b which functions as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward into an engaging portion formed in the cam member 55.

In this connection, as shown in FIGS. 9 and 10, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the cam mechanism 50 being held at a prescribed position, and a second operation when engaged with the second rack 6b of the disc tray 5, in which the cam member 55 is moved between the first position and the second position.

Namely, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engagement portion 55c of the cam member 55, thereby making it impossible for the planetary arm 66 to be turned around the axis 64b. As a result, the operative gear 65 is held at a prescribed position while the protrusion 59 of the cam member 55 is engaged with the first movement restricting groove 7a of the disc tray 5. In this state, as shown by the dashed line in FIG. 5, the operative gear 65 engages with the first linear rack 6a of the disc tray 5, whereby the disc tray 5 is moved from the disc eject position to the disc loaded position by means of the rotation of the operative gear 65 according to the rotation of the motor 61, and in this way the operative gear 65 functions as a driving gear for moving the disc tray 5.

On the other hand, when the disc tray 5 moves accordingly to a position just before the disc loaded position, the protrusion 59 of the cam member 55 also moves from the first movement restricting groove 7a to the second movement restricting groove 7b of the disc tray 5, and this causes the cam member 55 to be displaced by a small amount. Then, the disc tray 5 moves further, and when abutting portions 5d, 5e of the disc tray 5 come into abutment with wall portions 40b of the chassis 40 and thereby further movement of the disc tray 5 is restricted, the protrusion 59 reaches the third movement restricting groove 7c, whereby the cam member 55 is able to move from the first position to the second position. In this state, as shown by the dashed line in FIG. 6, since the operative gear 65 engages with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the motor 61.

In accordance with such a turning movement of the operative gear 65, the planetary arm 66 rotates clockwise around the common axis 64b from the position shown in FIG. 9 to the position shown in FIG. 10, which in turn causes the second arm 66c of the planetary arm 66 to rotate in the same direction. In accordance with this rotation of the second arm 66c, the cam member 55 is driven by means of the pin 68 coupled with the engaging portion 55c and moves from the first position shown in FIG. 9 toward the second position shown in FIG. 10. In accordance with this movement of the cam member 55 from the first position toward the second position, the front guide pins 43a, 43b of the base frame 43 of the mechanism unit 42 rise up along the slanting grooves 582, 582, whereby the front portion of the mechanism unit 42 is displaced from the lowered position shown in FIG. 5 to the raised position shown in FIG. 6.

Here, as the cam member 55 moves from the first position to the second position, the engaging pin 57 provided on the underside surface of the horizontal portion 55a of the cam member 55 actuates a detection pin 53b to turn off the loading motor 61, as shown in FIG. 9 and FIG. 10.

Figure 11:
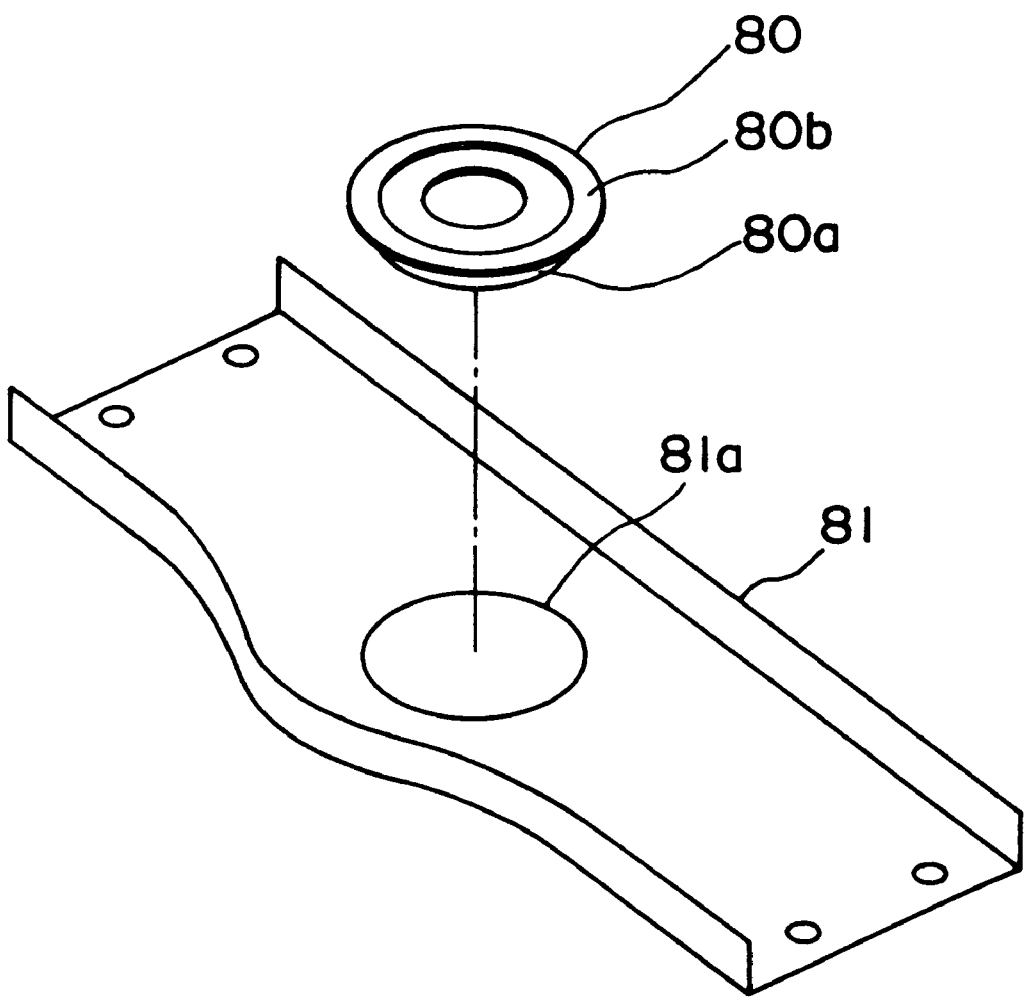
FIG. 11 is a perspective view of a disc damper of the disc drive according to the present invention.

Further, a disc damper 80 is provided on the upper side of the chassis 40. Namely, as shown in FIG. 11, the disc damper 80 is rotatably supported by a plate-shaped support member 81 having a central opening 81a.

In more details, the support member 81 is fastened at its both ends to bosses (or rivets) formed on mounting portions 40c in the opposite sidewalls 40b, 40b of the chassis 40 so as to secure the support member 81 to the chassis 40 in the side-ways direction. The disc damper 80 is formed from a flat drum-shaped main body 80a having a bottom portion that is inserted into the opening 81a of the support member 81, and a flange portion 80b which is formed around the upper circumferential portion of the main body 80*a*. The flange portion 80*b* is adapted to abut the top of the support member 81. Further, an annular steel attraction member is provided inside the main body 80*a* and is adapted to be pulled by the permanent magnet provided in the turntable 46.

Further, the disc drive 1A according to the present invention is equipped with an emergency eject mechanism 70 which enables the disc tray 5 to be manually moved forward to eject the optical disc 3 when the optical disc 3 stops rotating due to a power outage, for example, during the playback of the optical disc 3.

As shown in FIGS. 5 and 6, the emergency eject mechanism 70 is arranged in the front portion of the chassis 40 and is composed of a lever 71 which is provided in a rotatable manner on the side of the driving mechanism 60. The lever 71 is a roughly L-shaped member which includes a central portion 71*a* fixed to a rotation axis 72, a cam member moving portion 71*b* which extends from the central portion 71*a*, and a push portion 71*c* which also extends from the central portion 71*a* so as to be roughly perpendicular to the extending direction of the moving portion 71*b*. The front end of the cam member moving portion 71*b* is engaged with the engaging pin 57 formed on the underside surface of the horizontal portion 55*a* of the cam member 55, and the tip of the push portion 71*c* is formed into an operating member receiving portion for receiving an operating member (see the operative member 39 shown in FIG. 2) which is to be inserted through an aperture (not shown in the drawings) formed in the front panel 15.

With the emergency eject mechanism 70 constructed in this way, if the cam member 55 is moved from the first position shown in FIG. 9 (FIG. 5) to the second position shown in FIG. 10 (FIG. 6), the engaging pin 57 formed on the underside of the horizontal portion 55*a* of the cam member 55 pushes the cam member moving portion 71*b*, thereby rotating the lever 71 to the position shown in FIG. 6. In this second position, the mechanism unit 42 has been displaced into the raised position, and playback of the optical disc 3 is carried out.

Now, in the case where a power outage occurs in this condition, the motor 61 of the drive mechanism 60 stops operating, and this causes the mechanism unit 42 to stay at the raised position, thereby making it impossible to eject the optical disc 3 supported on the disc tray 5.

In such case, a slender rod-shaped operating member (jig) is inserted through the aperture formed in the front panel 15 of the disc drive 1A, with the tip of the operating member coming into contact with the operating member receiving portion 71*c* of the lever 71, and then in this state the operating member is manually pushed further inward. When this is done, the lever 71 rotates in the counterclockwise direction about the rotation axis 72 from the position shown in FIG. 6, and in accordance with such rotation, the cam member moving portion 71 b pushes the engaging pin 57 of the cam member 55 in the sideways direction, and as a result, the cam member 55 is moved from the second position (FIG. 10) to the first position (FIG. 9). Accordingly, the mechanism unit 42 is also displaced from the raised position (FIG. 6) to the lowered position (FIG. 5), thereby disengaging the optical disc 3 from the turntable 46 and causing the disc tray 5 to slightly protrude out of the aperture 15*a* of the front panel 15. In this state, the operative gear 65 of the driving mechanism 60 engages with the first rack 6*a* of the disc tray 5, thereby making it possible to grasp the protruding portion and manually pull the disc tray 5 out through the aperture 15*a* of the front panel 15.

As described above, the emergency eject operation of the disc tray 5 is an operation in which the cam member 55 is moved from the second position to the first position by inserting the operating member from the outside of the device main body 2 to rotate the lever 71 forcibly. According to the movement of the cam member 55, the operative gear 65 is rotated along the second rack 6*b* via the planetary arm 66. According to the rotation of the operative gear 65, other gears of the rotational speed reduction mechanism of the loading mechanism 50 are also rotated. In this case, since the gear ratios of the various gears of the rotational speed reduction mechanism are set at relatively low levels, as described above, a load required for the operation is not so high and therefore the emergency eject operation can be carried out with ease.

Next, referring to FIG. 12, the drive control section of the disc drive 1A will be described. FIG. 12 is a block diagram of the drive control section of the disc drive 1A shown in FIG. 4. The drive control portion 90 is roughly composed of an IDE interface 92 serving as the interface with an external host computer 91; a CPU 95 which includes a mechanical controller 93 for controlling the mechanical components and a system controller 94 for controlling the system; a motor driver 96 for driving the optical pick-up 47 for focusing or the like, the sled motor 48*a* of the optical pick-up moving mechanism 48, and the loading motor 61 of the loading mechanism 50; an FG servo section 97 for controlling the driving of the spindle motor 45; a servo processor 98 for controlling the motor driver 96 according to signals from the mechanical controller 93 and for conducting the phase compensation for each servo loop; an RF amplifier 99 for amplifying and processing an RF signal from the optical disc 3; an EFM (Eight to Fourteen Modulation) decoder 101 for EFM-modulating a signal from the RF amplifier 99; an audio amplifier 100 for amplifying digital audio data from the RF decoder 99; and a CD-ROM decoder 102 for adding data such as a header to a signal from EFM decoder 101.

The servo processor 98 sends a pulse-width modulated servo signal to the motor driver 96 in accordance with signals from the mechanical controller 93, and controls the sled motor 48*a* and the loading motor 61.

The EFM encoder 103 and the CD-ROM encoder 104 in the drawing are provided for writing data to the optical disc 3. Namely, they are provided for converting digital data such as audio data or video data into CD-ROM signals and EFM signals, when the present disc drive is constructed as a disc drive for CD-R (CD-Recordable).

The feature of this invention resides in the structure in which the loading motor 61 of the loading mechanism 50 is controlled by the mechanical controller 93 and the servo processor 98 through the motor driver 96. As will be described in detail later, the loading motor 61 is driven by rectangular pulses, and the number of rotations of the loading motor 61 is varied by changing the on/off widths of the rectangular pulses, thereby the moving speed of the disc tray 5 can be varied.

In this embodiment, the moving speed of the disc tray 5 is decreased in a stepwise manner over the period from the start of the movement to the stop of the movement of the disc tray 5 by the loading mechanism 50. More specifically, as shown in FIG. 13, the moving speed of the disc tray 5 for ejecting the disc 3, namely, over the period of its movement from the loaded position to the eject position, is controlled such that the moving speed of the disc tray 5 is decreased in a stepwise manner.

Described in more detail, the control is carried out as followings. First, as shown in FIG. 13(*a*), during the period up to 0.5 s after the turn-on of the loading motor 61, a constant pulse voltage as shown in FIG. 13(*b*) is supplied to the loading motor 61 of the loading mechanism 50 from the motor driver 96, by which the disc tray 5 is moved at a high speed.

Next, during the period from the lapse of 0.5 s to the lapse of 0.7 s as shown in FIG. 13(*a*), a rectangular pulse voltage of one cycle of 200 μs with on/off time ratio of 1:1 as shown in FIG. 13(*c*) is supplied to the loading motor 61, by which the disc tray 5 is moved at a somewhat lower speed.

Then, during the period from the lapse of 0.7 s to the lapse of 0.8 s as shown in FIG. 13(*a*), a rectangular pulse voltage of one cycle of 200 μs with on/off time ratio of 4:5 as shown in FIG. 13(*d*) is supplied to the loading motor 61, by which the disc tray 5 is moved at a still lower speed.

Then, during the period from the lapse of 0.8 s to the lapse of 0.86 s as shown in FIG. 13(*a*), a rectangular pulse voltage of one cycle of 200 μs with on/off time ratio of 2:3 as shown in FIG. 13(*e*) is supplied to the loading motor 61, by which the disc tray 5 is moved at a still lower speed.

Then, during the period from the lapse of 0.86 s to the lapse of 0.9 s as shown in FIG. 13(*a*), a rectangular pulse voltage of one cycle of 200 μs with on/off time ratio of 4:7 as shown in FIG. 13(*f*) is supplied to the loading motor 61, by which the disc tray 5 is moved at a still lower speed.

Then, during the period from the lapse of 0.9 s to the lapse of 0.94 s as shown in FIG. 13(*a*), a rectangular pulse voltage with one cycle of 200 μs with on/off time ratio of 1:2 as shown in FIG. 13(*g*) is supplied to the loading motor 61, by which the disc tray 5 is moved at a still lower speed.

Still further, during the period from the lapse of 0.94 s to the stop of the movement of the disc tray as shown in FIG. 13(*a*), a rectangular pulse voltage of one cycle of 200 μs with on/off time ratio of 1:3 as shown in FIG. 13(*h*) is supplied to the loading motor 61, by which the disc tray 5 is moved at a still lower speed.

When it is detected by a detection switch 53*a* that the disc tray 5 substantially reached the eject position, the situation represented by END in FIG. 13(*a*) is realized, and the current supply to the loading motor 61 is terminated. This is performed by the detection switch 53*a* which is provided so as to project from the front portion of the chassis. Namely, the detection switch 53*a* is turned off to terminate the current supply when it is brought into contact with a switch operating portion 7S (FIG. 7) formed on the underside surface of the disc tray 5.

As described in the above, it is possible to simply and precisely control the number of rotations of the loading motor 61 by varying the number of rotations of the loading motor 61 through appropriate change of the on/off widths of the rectangular pulses of the supplied voltage (driving voltage) to the loading motor 61. In particular, in the case of this embodiment, the moving speed of the disc tray 5 is made fast by setting the gear ratios of the rotational speed reduction mechanism of the loading mechanism 50 at a predetermined lower value. However, by applying a control such as in the above over the number of rotations of the motor 61, it is possible to bring the moving speed of the disc tray 5 to a sufficiently low level at least before it reaches the eject position, thereby enabling to prevent the imposition of an excessive load on the loading mechanism 50 and the disc 3.

The degrees of changes in the moving speed in the above are shown only for the purpose of example. It is needless to say that the mode of speed changes can be selected in various ways by varying the settings for the mechanical controller 93 and the servo processor 98.

In the above example, a description is made with reference to the ejecting operation (unloading operation), but a similar control can be applied also to the loading operation in which the disc tray 5 is moved from the eject position to the loaded position. In that case, the loading motor 61 is rotated in the reverse direction, and the control as shown in FIG. 13(*b*) to FIG. 13(*h*) is applied. With that arrangement, it is possible to have the moving speed of the disc tray 5 to be fast immediately after the start, and to be slow immediately before the stop.

Next, a description of the operation of the disc drive 1A will be given. When the disc drive 1A is not is use, the empty disc tray 6 is housed inside the casing 10 (inside the main body 2) at the disc loaded position. In this state, as shown in FIG. 6, the mechanism unit 42 is in the raised position, the cam member 55 is in the second position, and the protrusion 59 of the horizontal portion 55*a* of the cam member 55 is in the third movement restriction groove 7*c*. Further, as shown by the dashed lines in FIG. 6, the operative gear 65 of the driving mechanism 60 meshes an end portion of the second rack 6*b* of the underside surface of the disc tray 5 which is far away from the first rack 6*a* thereof.

Now, if an eject operation is carried out, the loading motor 61 will rotate in a prescribed direction, whereby the operative gear 65 is caused to rotate, by means of a rotational speed reduction mechanism. In this state, the operative gear 65 functions as a planetary gear which can be turned around the revolution axis 64*b*, and in accordance with this revolution, the operative gear 65 moves along the second rack 6*b* toward the first rack 6*a*. In accordance with the revolution of the operative gear 65, the planetary arm 66 rotates in the counterclockwise direction about the common axis 64*b*. In accordance with the rotation of the planetary arm 66, the second arm 66*c* causes the cam member 55 to move, via the pin 68, from the second position shown in FIG. 6 (FIG. 10) to the first position shown in FIG. 5 (FIG. 9), whereby the mechanism unit 42 is also moved from the raised position to the lowered position. In this case, while the cam member 55 is moving from the second position to the first position, the protrusion 59 on top of the horizontal portion 55*a* of the cam member 55 slides along the third movement restricting groove 7*c* and the second movement restricting groove 7*b* toward the first movement restricting groove 7*a*.

At that point, the operative gear 65 moves from the arc-shaped second rack 6*b* to the linear first rack 6*a*, and the protrusion 59 of the cam member 55 also moves from the second movement restricting groove 7*b* to the first movement restricting groove 7*a*. When the protrusion 59 of the cam member 55 is positioned in the first movement restriction groove 7*a*, the cam member 55 is restricted from moving in the sideways direction, so that the rotation of the planetary arm 66 is also restricted. In this state, the operative gear 65 acts as a driving gear for moving the disc tray 5 at that position. As a result, as shown by the dashed line in FIG. 5, the operative gear 65 engages with the first rack 6*a* of the disc tray 5, whereby the disc tray 5 is moved from the loaded position to the eject position according to the rotation of the motor 61. In this state, the mechanism unit 42 is displaced to the lowered position at a prescribed spacing from the disc clamp 80. Accordingly, the disc damper 80 and the turntable 46 do not hinder the eject operation of the disc tray 5.

Here, the loading motor 61 is driven to make its number of rotations decrease in a stepwise manner as described above with reference to FIG. 13, so the moving speed of the disc tray 5 is fast in the beginning and becomes slow gradually. Accordingly, even if the moving speed of the disc tray 5 is made fast by setting the gear ratios of the rotational speed reduction mechanism of the loading mechanism 50 at a relatively low value, it is possible to avoid a problem that a heavy load is imposed on the disc 3 and the loading mechanism 50 at the time of stop or the like of the disc tray 5 and thereby durability thereof is deteriorated.

Next, the loading operation of the disc tray 5 will be described. In this case, the loading operation is carried out by placing an optical disc 3 for playback or recording on the disc supporting portion 5a of the disc tray 5 which is protruded out from the aperture 15a of the front panel 15. When the playback or recording of the disc is unnecessary, the loading operation may be done without the optical disc.

As is the same with the prior art, there are two types of the loading operation, namely, the eject switch loading operation in which the loading motor 61 is turned on by operating the eject switch 18, and the manual loading operation in which the disc tray 5 protruded out to the eject position is pushed into a specified position manually by which the detection switch 53a is turned on and the loading motor 61 is actuated.

In the case of carrying out the loading of the disc tray 5 according to the eject switch loading operation, the loading motor 61 is turned on by operating the eject switch 18. The motor 61 will rotate in the opposite direction (i.e., the direction opposite to that described above), thereby causing the operative gear 65 to rotate, via the rotational speed reduction mechanism, in the counterclockwise direction (i.e., reverse direction) shown in FIG. 5. According to the rotation of the motor 61, the disc tray 5 moves backward (toward the rear of the disc drive) through the aperture 15a to the disc loaded position. In this way, the optical disc 3, which is supported at a prescribed position on top of the disc tray 5, will also be transported to the disc loaded position inside the main body 2.

During the loading of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at such a position, so that it functions as a driving gear for moving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, abutment portions 5d, 5e provided on the rear portion of the disc tray 5 abut the wall portion 40b of the chassis 40, thereby restricting any further movement of the disc tray 5. In this state, the protrusion 59 of the cam member 55 moves to the third movement restriction groove 7b via the second movement restriction groove 7b, thereby enabling the cam member 55 to move from the first position to the second position, which in turn also makes it possible for the planetary arm 66 to rotate. In this state, the operative gear 65 moves from the first rack 6a to the second rack 6b.

As a result, in this state, because the movement of the disc tray 5 is restricted while the planetary arm 66 is capable of revolution, if the operative gear 65 is rotated by the motor 61, the operative gear 65 moves and turns along the arc-shaped second rack 6b around the axis 64b. Therefore, in this state, the operative gear 65 functions as a planetary gear.

When the operative gear 65 functions as a planetary gear and moves along the arc-shaped second rack 6b as described above, the planetary arm 66 also rotates in accordance with the movement of the operative gear 65, around the common axis 64b in the clockwise direction shown in FIG. 5. When the planetary arm 65 rotates in this way, the second arm 66c of the planetary arm 66 also rotates in the same manner in the clockwise direction, thereby causing the cam member 55 to move from the first position to the second position.

In accordance with the movement of the cam member 55, the guide pins 43a, 43b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the central hole 3a of the optical disc placed on the disc tray 5 engages with the center hub 46a of the turntable 46. Then, by means of the pulling force which acts on the disc damper 80 by means of the permanent magnet of the turntable 46, the optical disc 3 is held between the turntable 46 and the disc damper 80.

In this regard, by the shift of the cam member 55 to the second position, the engaging pin 57 actuates the detection switch 53b and turns off the loading motor 61.

As mentioned above, the moving speed of the disc tray 5 can be varied even during the loading operation. In that case, the number of rotations of the loading motor 61 is controlled so as to be reduced (decreased) in a stepwise manner as described above with reference to FIG. 13, and as a result, the moving speed of the disc tray 5 is fast in the beginning and becomes slow gradually. Accordingly, even when the gear ratios of the rotational speed reduction mechanism of the loading mechanism 50 are set to be relatively low value to make the moving speed of the disc tray 5 fast, the moving speed of the disc tray 5 is made to be slow before it is brought to a stop. Consequently, the problem of the durability caused by an excessive heavy load imposed on the disc 3 or the loading mechanism 50 can be avoided.

On the other hand, when the disc tray 5 is loaded by the manual loading operation, the disc tray 5 is first pushed in manually in the direction of the arrow A in FIG. 4 to a specified position. In this case, the operative gear 65 is forcibly rotated as a result of the push-in motion of the disc tray 5. However, the gear ratios of the rotational speed reduction mechanism of the loading mechanism 50 are set at a relative low value, so the manual push-in operation of the disc tray 5 can be done readily with small force, and the operability of the device is improved.

As the disc tray 5 is pushed in manually to the specified position, the switch operating portion 7S formed on the underside surface of the disc tray 5 is brought into contact with the detection switch 53a to turn it on. By this operation the loading motor 61 is actuated, and thereafter the disc tray 5 is moved automatically to the disc loaded position in the same way as in the eject switch loading operation. In the case of the manual loading operation, it is also possible to reduce the speed of the loading motor 61 in a stepwise manner during the movement of the disc tray 5 to the loaded position as shown in FIG. 13 as described above.

When the replay switch and the like is operated in the state where the disc is loaded as in the above, the spindle motor 45 is rotated, the turntable 46 is rotated with it, and the playback of the optical disc 3 can be carried out.

Now, when playback is finished or when playback is stopped in order to switch to another disc, the eject switch 18 is pushed after operation of the playback switch (i.e., an operation to stop playback). When this is done, the operation described above for ejecting the disc tray 5 is carried out to eject the disc tray 5 on which the optical disc 3 is placed, to the outside of the main body 2.

Figure 2:
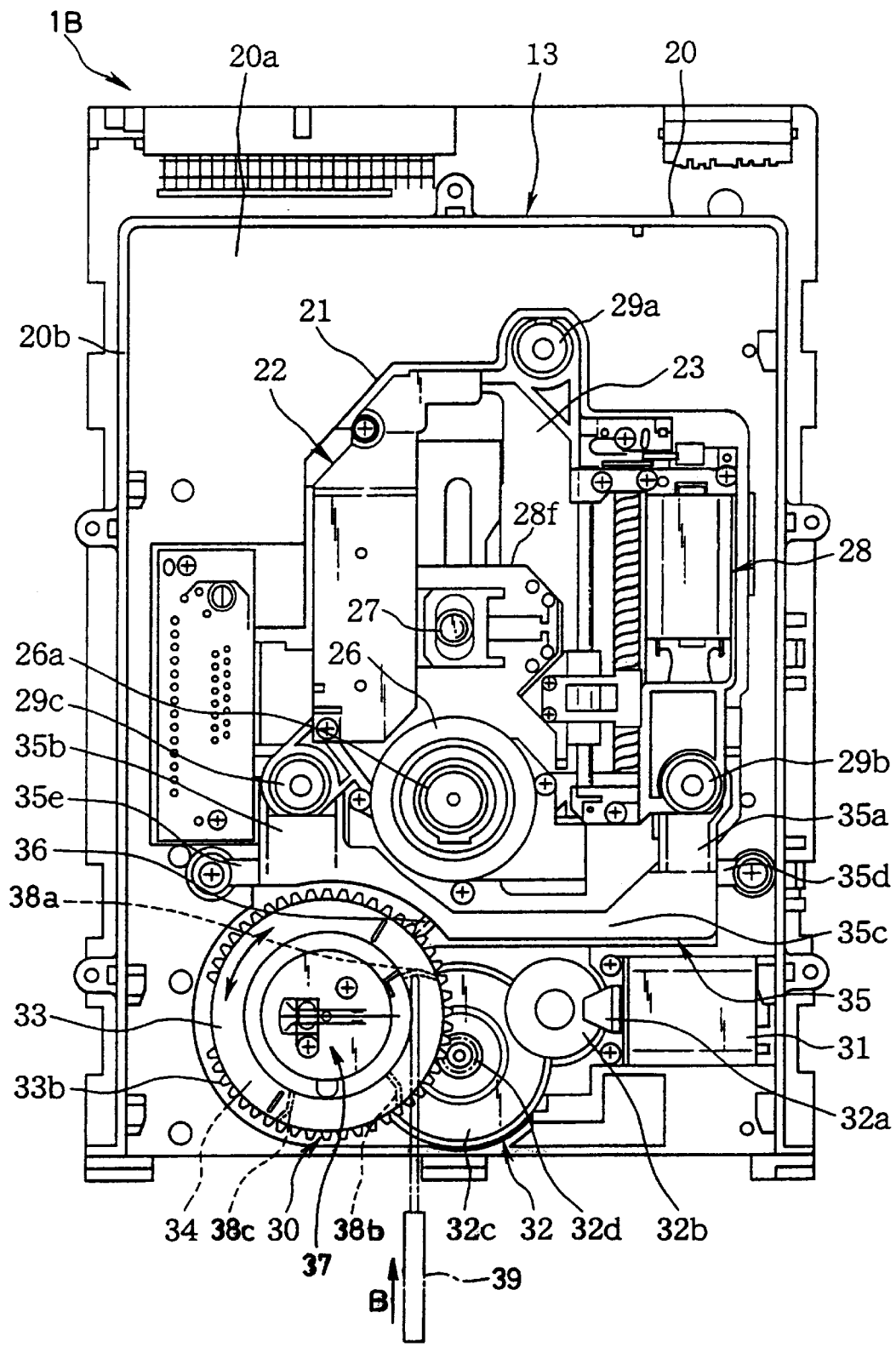
FIG. 2 is a top plan view of a mechanism assembly of the prior art disc drive.
Figure 3:
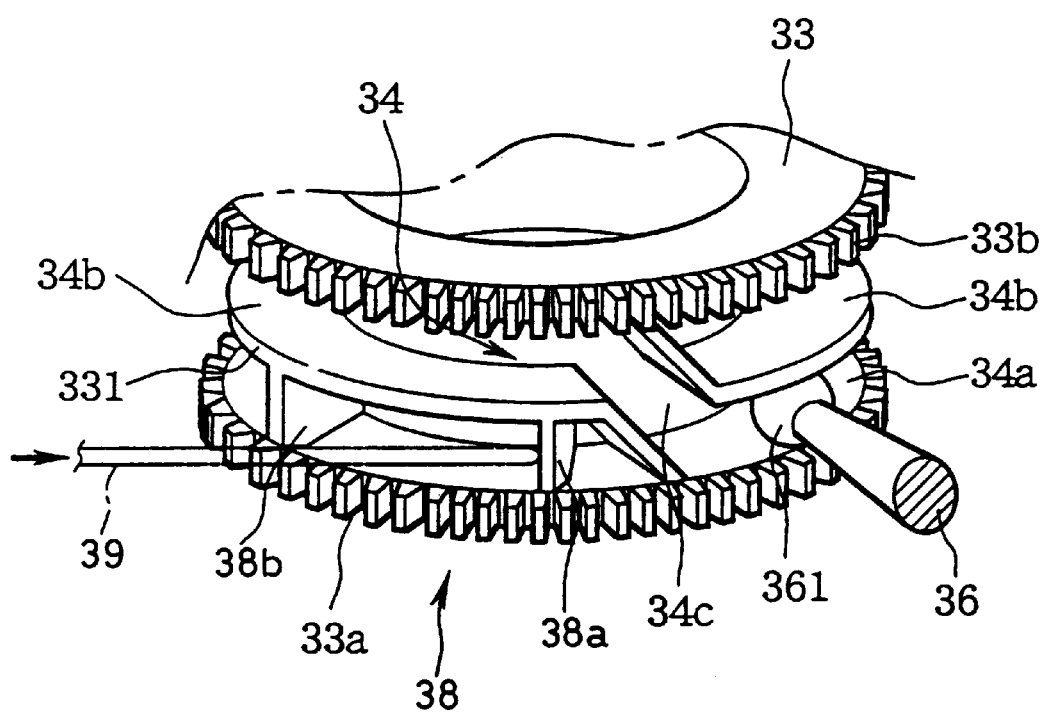
FIG. 3 is a perspective view of a cam wheel used in a loading mechanism of the prior art disc drive.

In the case where the loading motor 61 stops operating during playback of the optical disc due to a power outage or the like, the optical disc 3 is stopped at the loaded position. In such a case, the emergency ejecting operation described above is carried out, that is an operating member such as a pin shown in FIG. 2 is inserted through the insertion aperture of the front panel 15 of the disc drive 1A to push the push portion 71c of the lever 71 in order to rotate the lever 71. When this is done, the lever 71 is rotated in the counter-clockwise direction shown in FIG. 6, and in accordance with such rotation, the cam member moving member 71b is rotated in the same direction, whereby the cam member 55 is forcedly moved from the second position shown in FIG. 10 to the first position shown in FIG. 9, which at the same time causes the mechanism unit 42 to move from the raised position to the lowered position.

As a result, the optical disc 3 is released from the clamped condition between the disc damper 80 and the turntable 46 and returns to the disc supporting portion 5a of the disc tray 5. In this state, the operative gear 65 also moves from the second rack 6b to the first rack 6a, and the protrusion 59 formed at the corner of the horizontal portion 55a of the cam member 55 moves from the third movement restriction groove 7c to the first movement restriction groove 7a via the second movement restriction groove 7b.

Consequently, the disc tray 5 is forced to protrude out slightly from the aperture 15a of the front panel 15 of the disc drive 1A, whereby it becomes possible to grasp and manually pull the disc tray 5 outward to the eject position. Accordingly, in the above embodiment it is possible to easily eject the optical disc 3 with a small force even in the case where electrical power outage is happen power during playback.

In the emergency eject operation, not so large force is required for rotating the operative gear 65 that accompanies the displacement of the cam member 55 since the gear ratios of the rotational speed reduction mechanism of the loading mechanism 50 are set at a relatively low value, so that it is possible to rotate the lever 71 with a relatively small force. In addition, the work of pulling out the disc tray 5 by grasping its end does not require so large force. Accordingly, the structure of this embodiment has an advantage that it facilitates the disc ejection operation in emergency.

In the above, the disc drive according to the present invention has been described by reference to the drawings, but the invention is not limited only to this embodiment. In the above embodiment, the number of rotations of the loading motor 61 is controlled so as to be reduced in a stepwise manner from the start toward the end. However, the number of rotations of the loading motor 61 may be varied, for example, to be small at the start, increased in the midway, and made small again immediately before the end.

Further, it is needless to say that the structure of the disc drive and the configuration of the loading mechanism to which the present invention is applied is not limited only to those of the above embodiment. As long as it is a disc drive of the type having a disc tray, the present invention is widely applicable even to a disc drive having a loading mechanism described as the prior art and a disc drive having a loading mechanism of other structure.

Furthermore, the disc drive of the present invention is not limited to a disc drive for playback or recording/playback, and is applicable to device for playback or recording/playback a magnetic disc or magnet optical disc and the like, as long as it is of a type having a disc tray by which the disc can be conveyed.

Finally, R is to be noted that the present invention is not limited to the embodiments described above and any changes and modifications can be made without departing from the scope and sprit of the present invention which is defined by the following claims.

What is claimed is:

1. A disc drive comprising:

a disc drive main body;

a disc tray which is constructed to support a disc thereon and which is movable with respect to the disc drive main body between a disc eject position and a disc loaded position;

a mechanism unit which is provided in the disc drive main body having at least a turntable for rotating the disc and a pick-up for recording or recording/playback of the disc and which can be shifted between a raised position where the disc is supported by the turntable and a lowered position situated below the raised position;

a loading mechanism installed in the disc drive main body for moving the disc tray between the disc eject position and the disc loaded position, and for shifting the mechanism unit between the raised position and the lowered position;

a loading motor for actuating the loading mechanism and for moving the disc tray and the mechanism unit, the loading mechanism being provided with a rotational speed reduction mechanism composed of a plurality of gears for transmitting the rotation of the loading motor with reducing its speed to move the disc tray and the mechanism unit via the gears on the driven side of the rotational speed reduction mechanism which are operatively in mesh with the disc tray and the mechanism unit, respectively;

a manual loading mechanism by which the loading motor is turned on by manually pushing the disc tray to a specified position from the elect position with rotating forcedly the speed reduction gears of the loading mechanism and then the disc tray is moved automatically to the disc loaded position; and an emergency elect mechanism for moving the disc tray from the disc loaded position toward the disc elect position by manually operating the loading mechanism via an operating member from outside of the disk drive main body in an emergency so that the speed reduction gears of the loading mechanism are forcedly rotated, thereby enabling to shift the mechanism unit from the raised position toward the lowered position wherein the gear ratio of the speed reduction gears of the loading mechanism is set so that the manual loading mechanism and the emergency elect mechanism can be easily operated with a reduced power while the disc tray can be moved faster, and wherein the moving speed of the disc tray is adapted to be varied by changing the number of rotations of the motor so as to decrease in a stepwise manner over the period from the movement to the stop of the disc tray.

2. The disc drive as claimed in claim 1 wherein the moving speed of the disc tray decreases in a stepwise manner over the path from the loaded position to the eject position.

3. The disc drive as claimed in claim 1 wherein the moving speed of the disc tray decreases in a stepwise manner over the path from the eject position to the loaded position.

4. The disc drive as claimed in claim 1 further comprising:

a motor driver for driving the motor and the motor is arranged to be driven by rectangular pulses from the motor driver so that the number of rotations of the motor can be varied by changing the on/off widths of the rectangular pulses.

5. The disc drive as claimed in claim 4 wherein the on/off widths of the rectangular pulses are changed from an on/off time ratio of 1:1 to an on/off time ratio of 1:3 in a stepwise manner for decreasing the moving speed of the disc tray.

* * * * *

UNITED STATES PATENT AND TRADEMARK OFFICE
CERTIFICATE OF CORRECTION

PATENT NO.   : 6,005,833
DATED        : December 21, 1999
INVENTOR(S)  : Yasuma et al.

Page 1 of 1

It is certified that error appears in the above-identified patent and that said Letters Patent is hereby corrected as shown below:

Column 24,
Line 47, replace "elect" with "eject"
Line 48, replace "elect" with "eject"
Line 57, replace "elect" with "eject"

Column 9,
Line 61, replace "Fig. 13 is a timing device which shows" with "Figs. 13a-13h are timing charts which show"

Column 18,
Line 61, replace "Fig. 13" with "Figs. 13a-13h"

Column 20,
Line 65, replace "Fig. 13" with "Figs. 13a-13h"

Column 22,
Line 33, replace "Fig. 13" with "Figs. 13" with Figs. "13a-13h"
Line 63, replace "Fig. 13" with "Figs. 13" with Figs. "13a-13h"

Signed and Sealed this

Eleventh Day of September, 2001

Attest:

Nicholas P. Godici

NICHOLAS P. GODICI
*Attesting Officer*    *Acting Director of the United States Patent and Trademark Office*